United States Patent
Wilson

(10) Patent No.: US 7,285,868 B2
(45) Date of Patent: Oct. 23, 2007

(54) APPARATUS AND METHOD FOR ENERGY GENERATION WITHIN A TIRE

(76) Inventor: Kitchener Clark Wilson, 415 Calle Las Caleras, Santa Barbara, CA (US) 93109

( * ) Notice: Subject to any disclaimer, the term of this patent is extended or adjusted under 35 U.S.C. 154(b) by 0 days.

(21) Appl. No.: 10/626,294

(22) Filed: Jul. 24, 2003

(65) Prior Publication Data

US 2004/0100100 A1 May 27, 2004

Related U.S. Application Data

(60) Provisional application No. 60/476,606, filed on Jun. 7, 2003, provisional application No. 60/444,797, filed on Feb. 3, 2003, provisional application No. 60/413,394, filed on Sep. 25, 2002, provisional application No. 60/398,492, filed on Jul. 25, 2002.

(51) Int. Cl.
*F02B 63/04* (2006.01)
*F03G 7/08* (2006.01)
*H02K 7/18* (2006.01)

(52) U.S. Cl. .................................................. 290/1 R
(58) Field of Classification Search ............... 290/1 R; 152/145, 415; 340/448, 447, 445, 449, 451, 340/442; 73/146.5, 1.59, 1.57
See application file for complete search history.

(56) References Cited

U.S. PATENT DOCUMENTS

| | | | | | |
|---|---|---|---|---|---|
| 2,072,459 | A | * | 3/1937 | Lippitt | ................ 425/27 |
| 2,451,894 | A | * | 10/1948 | Weed | ................ 152/284 |
| 3,760,351 | A | * | 9/1973 | Thomas | ................ 340/443 |
| 4,405,872 | A | * | 9/1983 | Thomas | ................ 310/75 R |
| 4,429,232 | A | * | 1/1984 | Thomas et al. | ............ 290/1 R |
| 4,504,761 | A | * | 3/1985 | Triplett | ................ 310/339 |
| 4,657,289 | A | * | 4/1987 | Boyer | ................ 290/1 R |
| 5,570,286 | A | * | 10/1996 | Margolis et al. | ............ 701/36 |
| 5,573,611 | A | * | 11/1996 | Koch et al. | ............ 152/152.1 |
| 5,781,104 | A | * | 7/1998 | Huang | ................ 340/442 |
| 6,175,302 | B1 | * | 1/2001 | Huang | ................ 340/442 |
| 6,255,940 | B1 | * | 7/2001 | Phelan et al. | ............ 340/447 |
| 6,291,901 | B1 | * | 9/2001 | Cefo | ................ 290/1 R |
| 6,462,650 | B1 | * | 10/2002 | Balzer et al. | ............ 340/442 |
| 6,539,295 | B1 | * | 3/2003 | Katzen et al. | ............ 701/29 |
| 6,662,642 | B2 | * | 12/2003 | Breed et al. | ............ 73/146 |
| 6,768,230 | B2 | * | 7/2004 | Cheung et al. | ............ 310/30 |

(Continued)

*Primary Examiner*—Julio C. Gonzalez
(74) *Attorney, Agent, or Firm*—Richard S. Erbe

(57) ABSTRACT

Energy for in-tire use is generated from the load induced reciprocating deflection of the tire inner walls above the tire-to-road contact patch adjacent to the shoulder of the tire. This energy is used to power in-tire monitoring electronics. For pulsatile energy generation with capacitive capture, the capacitor is optimally selected in real-time as a function of pulse width to maximize energy capture, or as a function of the pulse-captured energy. The resulting energy pulses are also used to measure the time duration of the contact patch from which the contact patch length is determined thus providing real-time tire geometry and, with tire pressure, real time tire load and, with temperature, tire air molar content. The loads on all tires provide real time vehicle mass and mass distribution. For electrical energy generation, magnet-coil, piezo-electric, and other power conversions are applicable. For non-electric energy generation, fluid bellows, rotary pump, and other power conversions are applicable. Further, run flat tires are designed with a cutout to accommodate and protect electronic devices mounted on an inner surface when running flat.

21 Claims, 24 Drawing Sheets

U.S. PATENT DOCUMENTS 6,812,583 B2 * 11/2004 Cheung et al. ............. 290/1 R
2003/0146676 A1 * 8/2003 Mancosu et al. ........... 310/339
2004/0164558 A1 * 8/2004 Adamson et al. ........... 290/1 R

* cited by examiner

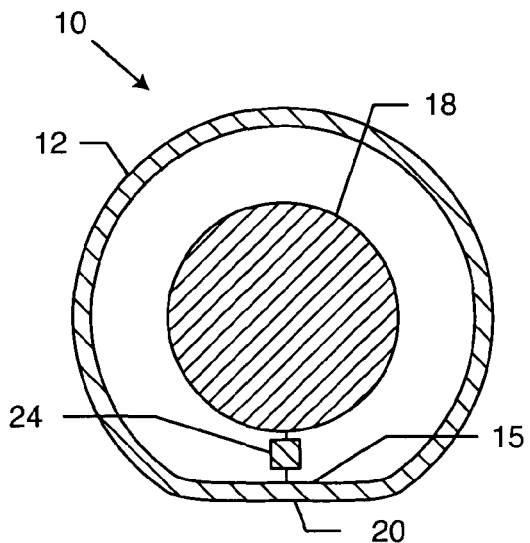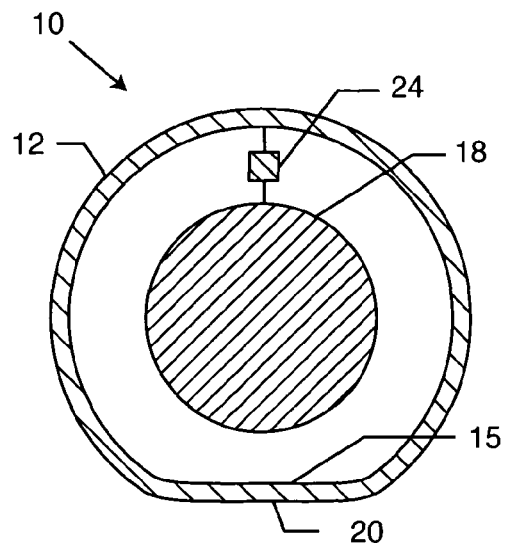
FIG. 1          FIG. 1A
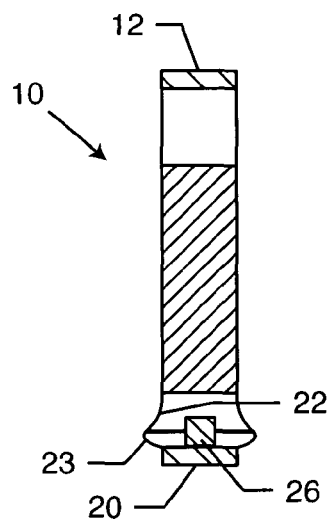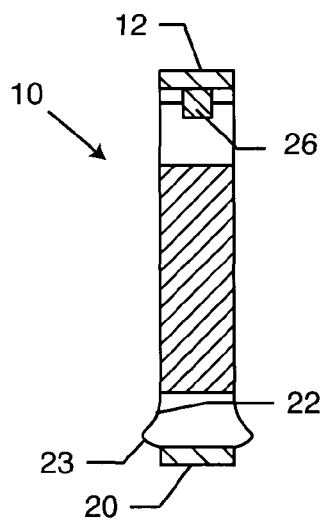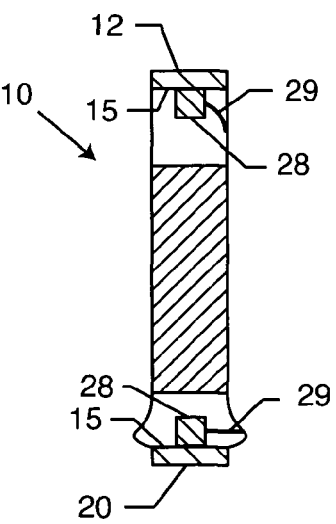
FIG. 2     FIG. 2A     FIG. 4

APPARATUS AND METHOD FOR ENERGY GENERATION WITHIN A TIRE

RELATED APPLICATIONS

This application claims the benefit of U.S. Provisional Application Ser. Nos. 60/398,492 filed 25 Jul. 2002; 60/413,394 filed 24 Sep. 2002; 60/444,797 filed 3 Feb. 2003; 60/476,606 filed 7 Jun. 2003; and pending U.S. patent application Ser. No. 10/143,312, filed 10 May 2002, all of which are incorporated herein by reference in their entireties.

BACKGROUND OF THE INVENTION

1. Field of the Invention

The present invention relates generally to vehicle tires and to devices placed within the tires. More particularly, the present invention relates to apparatus and methods to generate renewable power within the tire to activate instrumentation placed within the tires. The generated power signals are also used to measure the length of the tire-to-road contact region and tire geometry that, with tire pressure, provides the tire load, the mass and center-of-mass of the vehicle, and other derived tire or vehicles values known in the field. The invention further relates to energy-optimal pulsed power capture circuits. The invention further relates to the design of run flat tires that accommodate devices mounted onto the inner tread surface for generating and capturing power or monitoring tire or vehicle status.

2. General Background and State of the Art

The Ford Explorer and Firestone Tire failures generated a great deal of interest in monitoring tires. The American automobile industry and United States Congress moved to require real-time monitoring of tire pressure to detect under-inflated tires (TREAD Act of 1 Nov. 2000). Two methods of accomplishing such monitoring have resulted: a direct method that places a pressure sensor within each tire that communicates its readings over a radio link to the main body of the vehicle; and an indirect method that monitors the rotation rates of the tires using sensors on the main body of the vehicle and infers a less inflated tire as having a higher rotation rate.

Of the two methods, the direct method is considered more accurate. It is also the most adaptable as tire temperature, tire load, and other tire sensors can be included which piggyback their data onto the radio data link to the main body of the vehicle. Currently these devices are battery operated and, to maintain battery life over the life of the tire, are activated only intermittently. Continuous tire monitoring with this method is not practical because the battery would be drained too quickly, battery replacement is not a simple task, and high capacity batteries are too large or expensive to be accommodated within the tire.

The ability to perform rapid and nearly continuous tire monitoring is preferred and would make it possible to use the tire as a dynamic sensor and adapt the vehicle control system accordingly. There is a need to provide an apparatus and method to generate sufficient power from a renewable resource within the tire to sustain continuous or nearly continuous monitoring, or eliminate the need for a battery for intermittent monitors.

Earlier devices, such as those disclosed in U.S. Pat. No. 3,699,367 (Thomas), U.S. Pat. No. 3,760,351 (Thomas), U.S. Pat. No. 4,061,200 (Thompson), and U.S. Pat. No. 6,291,901 B1 (Cefo) couple the reciprocating radial deflation motion to a magnet or coil or fluid pump in order to generate electricity, with the disadvantage of having to attach delicate devices to the wheel inner rim where they can be damaged by installers. Others, such as the device disclosed in U.S. Pat. No. 4,504,761 (Triplett), use piezoelectric devices driven by the motion of an outer portion of the tread with respect to an inner portion, which has the disadvantage of potentially weakening the structure of the tire. U.S. Pat. No. 4,220,907 (Pappas) discloses a magnet mounted on the inner tread surface that opens and closes a magnetic flux circuit as the tread goes flat on the contact patch. U.S. Pat. No. 4,429,232 (Thomas) suggests a rotational generator mounted on a rim track and using gravity as a reference with the disadvantage of requiring a low friction track within a very dirty tire. U.S. Pat. Nos. 5,889,464, 6,175,302 (Huang) suggest piezo-electric devices driven by vibrations within the tire.

None of the cited prior art references, taken either singly or in combination, is seen to describe the present invention as disclosed and claimed.

None of the cited prior art references provide a real-time optimal method to generate maximum energy.

None of the cited prior art references provide a run flat tire adapted to support a monitoring or power generating device mounted on its inner tread surface.

SUMMARY OF THE INVENTION

Accordingly, it is an object of the present invention to provide a tire power generating system and method that is configured to generate enough power to sustain continuous or nearly continuous monitoring of the tire parameters, or eliminate the need for batteries in current intermittent monitors.

An additional object of the invention is to provide a tire power generating system that may be mounted within a tire without being damaged when the tire is mounted onto its rim.

It is yet another object of the invention to provide a tire power generating system whose installation does not weaken the tire structure.

Still another object of the invention is to provide a tire power generating system that does not require a low friction track circumferential to the rim.

A further object of the invention is to provide a tire power generating system that is not driven by tire vibration.

It is yet another object of the invention to provide a tire parameter monitoring system that can generate power from a renewable source.

A further object of the invention is to provide a tire parameter monitoring system and method that does not require the use of high capacity batteries, or batteries at all.

It is a further object of the invention to provide a run flat tire within which a device, such as a tire or vehicle monitor or power generator, can be mounted and not be damaged when the tire is flat.

These and other objectives are achieved by the present invention, which, in a broad aspect, is an inner wall deflection generator comprising a power generator that couples to the relative inner wall deflection motion induced by a load on a rotating tire, thus producing useable power. A magnet-coil generator and a piezo-electric power generator are presented as illustrations. In one aspect of the invention, the generator is connected to the outer radius portion or shoulder of the tire.

The present invention also allows for optimal pulse energy capture when the energy source has a significant resistance and the energy is captured on a capacitive device.

The present invention also allows for determining the length of the road contact region.

The present invention also allows for a run flat tire within which a device, such as a tire or vehicle monitor or power generator, can be mounted and not be damaged when the tire is flat utilizing a cutout to protect the device when the tire is deflated.

The ability to perform rapid and nearly continuous tire monitoring is enabled and makes it possible to use the tire as a dynamic sensor and adapt the vehicle control system accordingly. The present invention generates power from a renewable resource within the tire in sufficient quantity to sustain continuous or nearly continuous monitoring of the parameters, or to charge a battery or storage capacitor.

Further objects and advantages of the present invention will become more apparent from the following description of the preferred embodiments, which, taken in conjunction with the accompanying drawings, will illustrate, by way of example, the principles of the invention.

BRIEF DESCRIPTION OF THE DRAWINGS

FIG. 1 is a front cutaway view of a wheel of conventional design shown in loaded condition with radial deflation reciprocation and adapted to generate power from the tire radial deflation reciprocating motion, where the power generator is located on the road contact region.

FIG. 1A is a front cutaway view of a wheel of conventional design shown in loaded condition with radial deflation reciprocation and adapted to generate power from the tire radial deflation reciprocating motion where the power generator is located away from the road contact region.

FIG. 2 is a side cutaway view of a wheel of conventional design shown in loaded condition with inner wall deflection reciprocation and adapted to generate power from the tire inner wall deflection reciprocating motion where the power generation device is located on the road contact region.

FIG. 2A is a side cutaway view of a wheel of conventional design shown in loaded condition with inner wall deflection reciprocation and adapted to generate power from the tire inner wall deflection reciprocating motion where the power generation device is located away from the road contact region.

FIG. 4 is a side cutaway view of a wheel adapted with an inner wall deflection generator mounted onto the tread inner lining and making contact with only one tire inner wall surface and having a flexible coupling to that surface; the generator is shown both on the road contact region and away from it.

DETAILED DESCRIPTION OF THE PREFERRED EMBODIMENTS OF THE INVENTION

Figure 3:
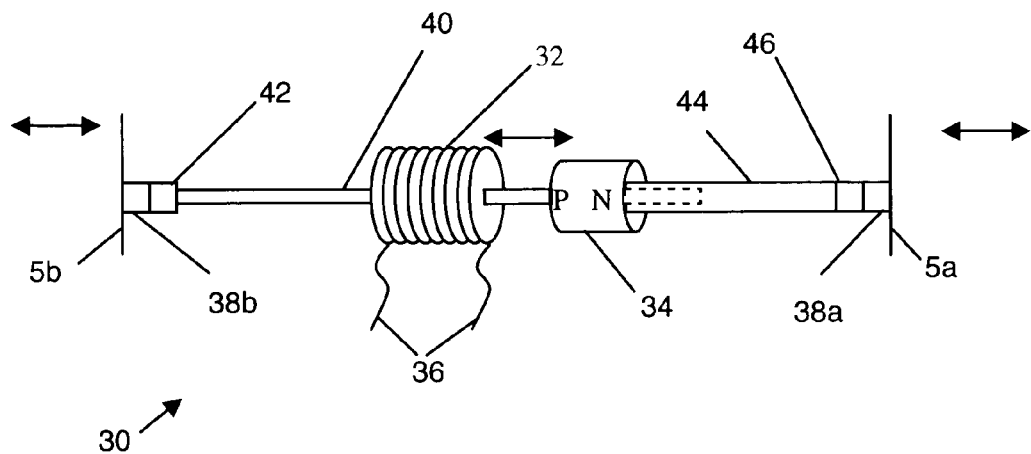
FIG. 3 is a schematic of a magnet-coil generator applicable to inner wall deflection energy generation.

FIGS. 1 and 2 show a loaded vehicle tire 10 mounted on a rim 18 and its mechanical reciprocation induced by the tire 10 going from round to flat at the tire-to-road contact region 20. The following reciprocation motions are periodic (once per revolution)

as shown in FIG. 1, the shortening of the distance from the rim to the tire tread as the tire temporarily deflates when on the contact region; and as shown in FIG. 2, on the tire shoulder just above the tread, the widening of the distance between the tire inner walls as each wall deflects (balloons) outward when on the contact region.

Both reciprocating motions are used to generate power by connecting an energy conversion device within the tire 10 to utilize the motions. A radial deflation generator 24 connects between the tire tread 12 inner surface 15 and the rim 18 as shown in FIGS. 1 and 1A. An inner wall deflection 26 generator connects between the two inner wall surfaces 22 of the tire 10 at shoulder 23, near the tread 12, as shown in FIGS. 2 and 2A. Linkages on the ends of both generators are attached to respective surfaces using fasteners that are adhered to the wheel surfaces or molded into them.

The inner wall deflection generator 26 has the advantages over the radial deflation generator 24 of not being dependent on the orientation of the tire 10 relative to the rim 18, and not having a mechanism strung between the rim 18 and the tread inner surface 15. The rough process of mounting a tire onto a rim randomizes the relative angular orientation between a point on the rim 18 and a point on the tread 12, and mechanisms strung between them are susceptible to damage by the installer's tools.

The inner wall deflection reciprocating motion is converted to useful power using any conversion device that does not impede the flexing of the tire 10. For example, as shown in FIG. 3, a magnet and coil arrangement 30 will induce electricity in the coil 32 as a pole of magnet 34 is moved relative to it. The magnet 34 is supported by its shaft 44 that ends in a fastener 46; fastener 46 has a mating fastener 38a bonded to an inner surface 22 noted as 5a. Coil 32 is supported by shaft 40 that rides within magnet shaft 44 and ends in a fastener 42; and fastener 42 has a mating fastener 38b bonded to another inner surface 22 noted as 5b. As the tire turns through the road contact region 20, inner wall surfaces 5 balloon outward in opposite directions at shoulder 23. This balloon deflection moves magnet 34 relative to coil 32 and generates electricity that is made available to the tire parameter monitoring device through wires 36.

Alternately, the motion may drive a bellows or piston to generate compressible or incompressible fluid flow, a small rotating generator, or bend a piezo-electric device. Those skilled in the art will recognize that other conversion devices may be used.

Another version of the inner wall deflection generator, mounted between a single inner wall 22 and the inner tread surface 15 at shoulder 23, is indicated generally as numeral 28 in FIG. 4. The deflection of the single inner wall 22 is accommodated by, for example, a flexible connecting linkage 29. Since the motion of only one inner wall is used, the motion that drives the generator 28 is half of that if two inner walls 22 were coupled.

A Magnet-Coil Generator

Figure 5:
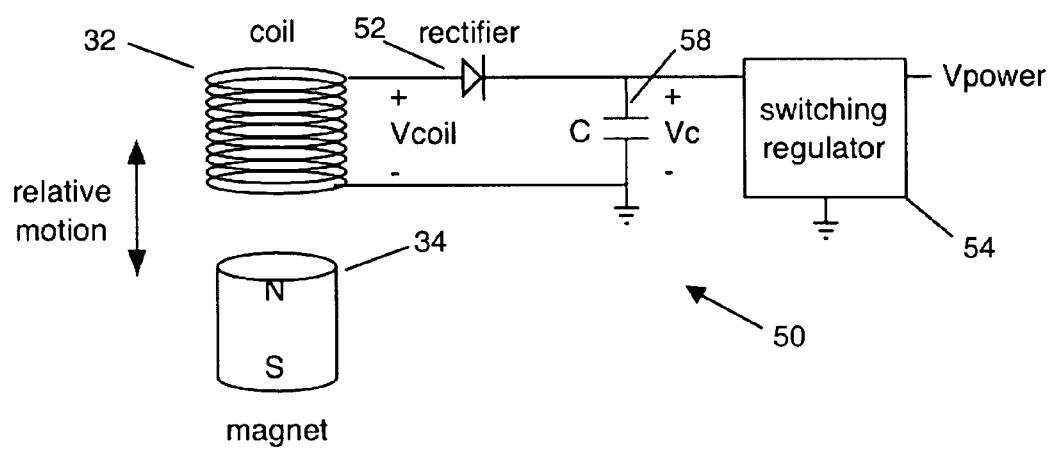
FIG. 5 is a schematic of the basic circuitry of the magnet-coil power generator showing the magnet-coil interaction, the rectifier and peak capture diode, a voltage capture capacitor, and a switching regulator.
Figure 6:
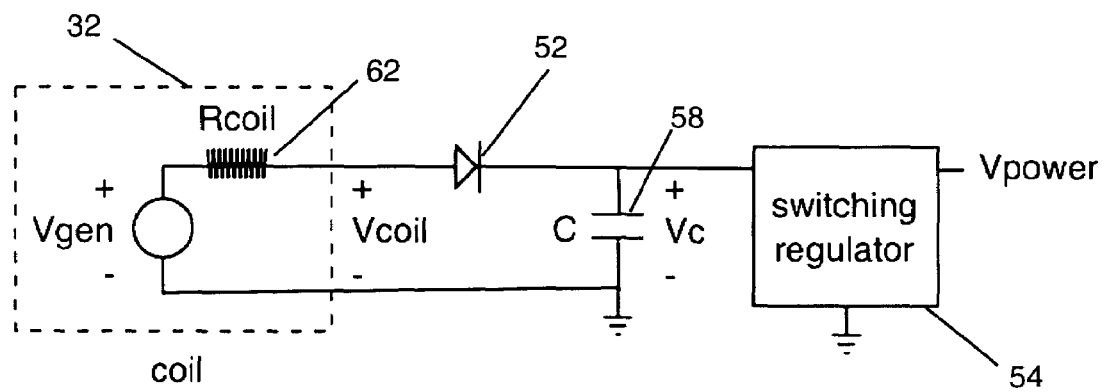
FIG. 6 is a schematic of the equivalent electrical circuit of the basic magnet-coil power generator where the magnet is not shown.
Figure 21:
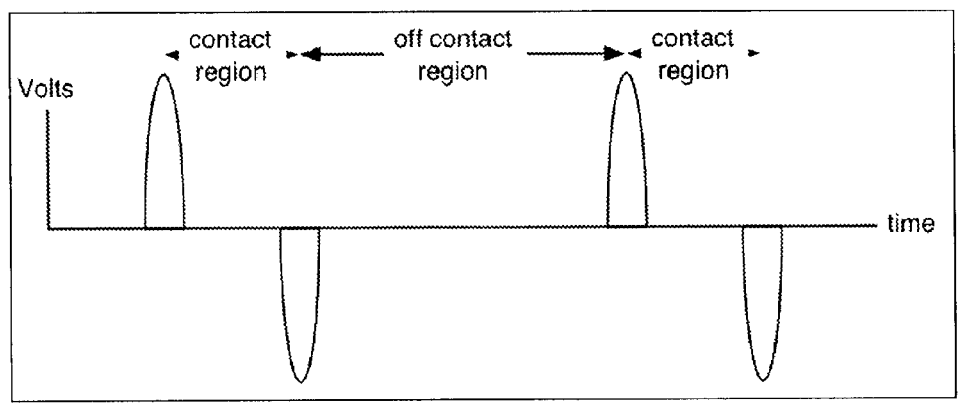
FIG. 21 is a graph of the induced voltage pulses ($v_{gen}$) within the coil of the magnet-coil generator as the tire rotates into and out of the road contact region.

The electricity generated by generator 30 consists of positive and negative pulses, as the inner wall deflects outward and returns inward, and is captured on a capacitor and converted to regulated power by, for example, a conventional solid state switching regulator 54. A basic schematic is presented generally as numeral 50 in FIG. 5, an equivalent circuit in FIG. 6, and the induced voltage pulses are illustrated in FIG. 21. A diode is used as a half-wave rectifier 52 to select the positive going pulse and form a peak voltage capture circuit in conjunction with the capacitor 58. Alternately, a full-wave rectifier captures both the positive and negative pulses.

The relative motion of the magnet 34 and coil 32 generates a voltage across the coil that increases with, among other factors, the motion velocity and the number of turns in the coil 32. The shorter the coil 32 with respect to the length of the magnet 34, the more voltage is generated since the individual turns see the same magnetic field and their induced voltages are more time-synchronous with each other as they sum together. The coil 32 should also be shorter than half the length of the magnet 34 so that the south pole does not contribute a flux change at the same time that the north pole does, as these will counter one another.

The greater the number of turns in the coil 32, the greater the induced voltage but also the greater the coil resistance 62. This resistance, coupled with the capacitor 58 and the resistance of the rectifier 52, forms a low-pass filter that limits the circuit response to rapid signal changes. As the tire rotation increases, the width of the induced pulses is reduced and voltage capture is affected. Reducing the capacitance can speed the circuit 50 and allow it to capture more of the voltage pulse, but this may also reduce the captured energy that is proportional to the capacitor value. A design that captures the most energy per pulse needs to consider the following:

- the magnet strength, length and diameter;
- the coil winding length, resistance and number of turns;
- the capacitance; and
- the generated voltage pulse width.

The relative motion of the magnet and coil generates a voltage $v_{gen}$ according to the laws discovered in the 1830's by Michael Faraday, Joseph Henry, and Heinrich Lenz $$v_{gen} = -n_{coil} A_{coil} \dot{B}_{magnet}$$
$$= -\frac{\pi}{4} n_{coil} d_{magnet}^2 \dot{B}_{magnet}$$

In this equation $n_{coil}$ is the number of turns in the coil, $A_{coil}$ and $d_{magnet}$ are the area of the coil and diameter of the magnet, respectively, and $\dot{B}_{magnet}$ is the net rate of change of the magnetic field through the coils and is proportional to the velocity of the relative motion. The equivalence of $A^{coil} = \pi (d_{magnet}/2)^2$ assumes the coil is wound with essentially the same diameter as the magnet. Practically, the actual voltage generated must account for the magnetic-coil coupling, the length of the coil, and other factors that can be determined experimentally or by simulation of the magnetic fields.

The Magnet: Many types of conventional magnetic materials (Alnico, Ceramics, and Rare Earths) are available from several manufactures. Alnico magnets can have high magnetic strengths (residual induction, $B_R$ 12,500 Gauss) and can sustain high temperatures ($T_{MAX}$ 540 C) but are too easily demagnetized (their intrinsic coercive Force, $H_{CI}$, is around 640 Oersteds and so low that they can demagnetize themselves). Ceramic magnets are very stable ($H_{CI}$ 3200) and can handle high temperatures ($T_{MAX}$ 300 C) but do not have strong magnetic strengths ($B_R$ 3900). Samarium Cobalt (SmCo) Rare Earth magnets are strong ($B_R$ 10,500) and stable ($H_{CI}$ 10,000) and can handle high temperatures ($T_{MAX}$ 300 C). Neodymium Iron Boron (NdFeB) Rare Earth magnets are even stronger ($B_R$ 12,800), are very resistant to demagnetization ($H_{CI}$ 21,000), can handle automotive temperatures ($T_{MAX}$ 150 C), and are inexpensive relative to SmCo. For the preferred embodiment of the invention, a cylindrically shaped NdFeB magnet is chosen.

Figure 22:
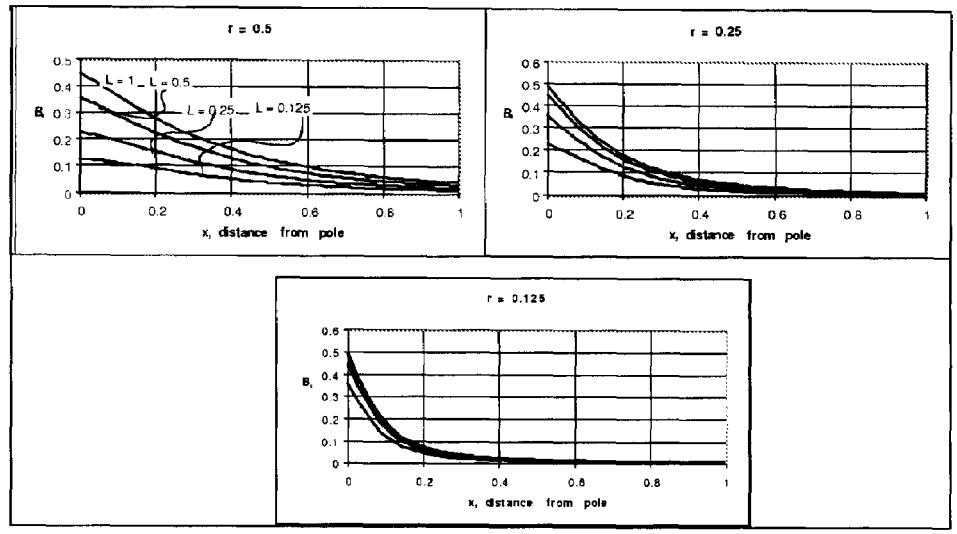
FIG. 22 is a graph of the expected magnetic field ($B_x$) vs. distance from pole (x) vs. magnet length (L) and radius (r) where $B_r$ is normalized to one.

Although the NdFeB magnets are inexpensive as far as Rare Earth magnets go, a smaller magnet is still less expensive than a larger one but a long magnet is needed to give room to form a coil of around half its length. For magnetic materials with straight line normal demagnetization curves, such as Rare Earths and Ceramics, the magnetic field generated by a cylindrical magnet with poles on its ends at a distance x from a pole along its axis is generally given by $$B_x = \frac{B_R}{2} \left( \frac{L_{magnet} + x}{\sqrt{r_{magnet}^2 + (L_{magnet} + x)^2}} - \frac{x}{\sqrt{r_{magnet}^2 + x^2}} \right)$$

where $L_{magnet}$ is its length and $r_{magnet}$ is its radius. This field as a function of x and of $L_{magnet}$ is shown in FIG. 22 and illustrates the relative insensitivity of B to the length of the magnet. From these graphs we see that a magnet with a length greater or equal to its diameter will maintain over 90% of its maximum field of 0.5 $B_r$. This means short and therefore less expensive magnets can be used.

The issue of coil length versus magnet length is resolved by extending the effective flux length of the magnet by adding a ferrous slug 96. Whereas in the isolated magnet 34 the field lines flow from one pole to the other, in the extended magnet they are captured within the slug 96 that is more permeable to magnetic fields than is free space. The transition between the magnet 34 and slug 96 will have some affect and should be closely coupled with, possibly, a wrap of mu-metal to block unwanted fields.

The Coil Electrical Resistance: The coil has many turns and is made of quite a long length of wire. Wire has a resistance 62 proportional to the wire length and inversely proportional to the wire cross-sectional area (or square of its diameter), and is dependent on the wire temperature. For a pure copper wire, its resistance in ohms is conventionally determined as:

$$R_{wire} = 1.72 \times 10^{-8} \frac{L_{wire}}{Area_{wire}} \text{ at } 20° \text{ C.}$$

$$= \frac{4}{\pi} 1.72 \times 10^{-8} \frac{L_{wire}}{d_{wire}^2} \text{ at } 20° \text{ C.}$$

$$= \frac{6.88 \times 10^{-8}}{\pi} \frac{L_{wire}}{d_{wire}^2} \text{ at } 20° \text{ C.}$$

$$= \frac{6.88 \times 10^{-8}}{\pi} \frac{L_{wire}}{d_{wire}^2} [1 + 0.00393(T - 20° \text{ C.})] \text{ at any temperature}$$

where $d_{wire}$ is the diameter of the wire measured in meters, $L_{wire}$ is its length in meters, and T is the wire temperature in Centigrade. Assuming, again, that the diameter of the coil is essentially that of the magnet $$L_{wire} = \pi n_{coil} d_{magnet}$$

and $$R_{coil} = \frac{6.88 \times 10^{-8}}{\pi} \frac{\pi n_{coil} d_{magnet}}{d_{wire}^2} [1 + 0.00393(T - 20° \text{ C.})]$$

$$= 6.88 \times 10^{-8} \frac{n_{coil} d_{magnet}}{d_{wire}^2} [1 + 0.00393(T - 20° \text{ C.})]$$

The Energy Capture Circuitry Response: The rectifier 52 (fill or half-wave) assures the peak voltage is captured on the capacitor 58, and the differential equation describing the voltage across the capacitor 58 is $$\dot{v}_c(t) = \begin{cases} \frac{1}{R_{source}C}[v_{gen}(t) - v_c(t)] & \text{if } v_{gen}(t) \geq v_c(t) \\ 0 & \text{if } v_{gen}(t) < v_c(t) \end{cases}$$

The resistance of the source supplying the capacitor is $R_{source} = R_{rectifier} + R_{coil}$, and the energy in Joules captured on the capacitor 58 is $$E_c = \frac{C}{2} v_c^2$$

In terms of LaPlace transforms, and assuming the capacitor is initially discharged, the time-dependent differential equation valid while $v_{gen}(t) \geq v_c(t)$ is written in its algebraic frequency-dependent form as $$\frac{V_c(s)}{V_{gen}(s)} = \frac{\omega_{RC}}{s + \omega_{RC}}$$

where s is the complex frequency independent variable, and $$\omega_{RC} = \frac{1}{R_{source}C}$$

Figure 23:
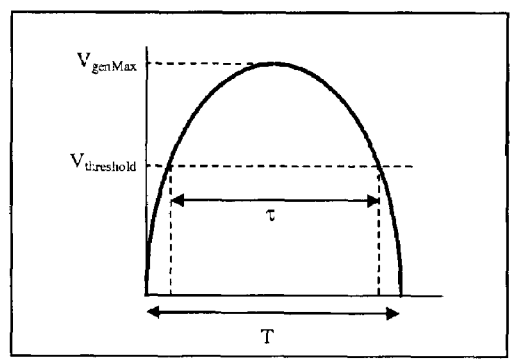
FIG. 23 is a graph of a half-sine model of the induced voltage ($v_{gen}$) showing its peak value, period, a voltage threshold and the time the voltage is above the threshold.

The voltage generated within the coil is modeled as a half sine wave having a peak voltage $v_{genMax}$ and a pulse width of T seconds, as shown in FIG. 23. This representation accounts for the Fourier fundamental first harmonic of any actual signal and provides a continuously differentiable formulation for subsequent analysis. The sinusoidal signal has a frequency in radians/sec of $$\omega_{gen} = \frac{\pi}{T}$$

and the LaPlace transform of the sine function is $$V_{gen}(s) = \frac{V_{genMax} \omega_{gen}}{s^2 + \omega_{gen}^2}$$

The LaPlace transform of the voltage across the capacitor is calculated as $$V_c(s) = \frac{\omega_{RC}}{s + \omega_{RC}} V_{gen}(s)$$

$$= \omega_{RC} V_{genMax} \omega_{gen} \frac{1}{s + \omega_{RC}} \frac{1}{s^2 + \omega_{gen}^2}$$

which is written using partial fractions as $$V_c(s) = \frac{\omega_{RC} V_{genMax} \omega_{gen}}{\omega_{RC}^2 + \omega_{gen}^2} \left( \frac{1}{s + \omega_{RC}} + \frac{\omega_{RC} - s}{s^2 + \omega_{gen}^2} \right)$$

Figure 24:
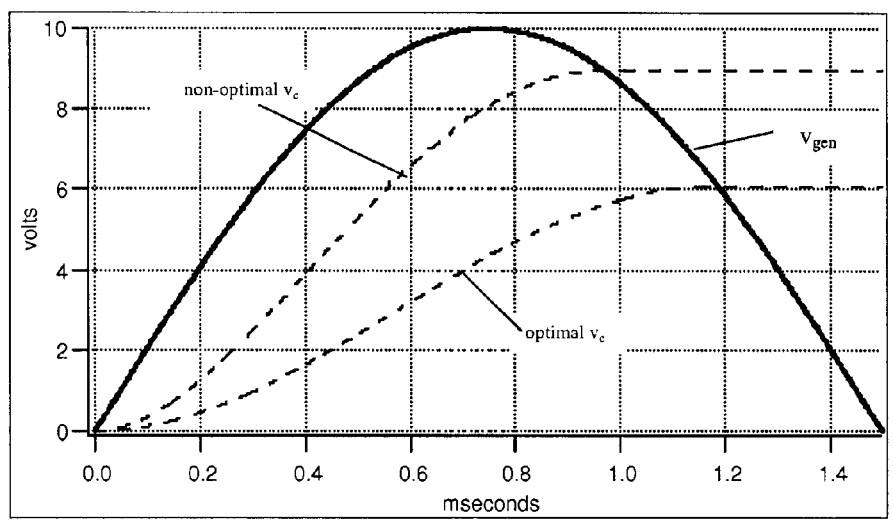
FIG. 24 is a graph showing $v_{gen}$ (solid) and $v_c$ (dotted) for T =1.5 msec, $v_{genMax}$=10 volts, $\omega_{RC}$=4000 rad/sec for an energy-optimal capacitor value and for a non-optimal value.

The inverse LaPlace transform (ignoring forward voltage drops across the rectifier) is then $$v_c(t) = \frac{\omega_{RC} V_{genMax}}{\omega_{RC}^2 + \omega_{gen}^2} (\omega_{gen} e^{-\omega_{RC} t} - \omega_{gen} \cos \omega_{gen} t + \omega_{RC} \sin \omega_{gen} t)$$

which represents the voltage across the capacitor up to the instant when it is equal to $v_{gen}(t)$ after which it does not change. Illustrations of the results of this equation are presented in FIG. 24.

The rectified voltage captured on the capacitor has a positive derivative up to the instant it crosses $v_{gen}(t)$ where the derivative goes to zero. As such, the voltage is the maximum value of $v_c$ over the pulse width and is defined as the value of $v_c$ at the time $t_{max}$ when $\dot{v}_c = 0$ $$\dot{v}_c(t_{\max}) = \frac{\omega_{RC}\omega_{gen}v_{genMax}}{\omega_{RC}^2 + \omega_{gen}^2}$$
$$(-\omega_{RC}e^{-\omega_{RC}t_{\max}} + \omega_{gen}\sin\omega_{gen}t_{\max} + \omega_{RC}\cos\omega_{gen}t_{\max}) \equiv 0$$

or, alternatively and equivalently, when $v_c = v_{gen}$ $$v_{genMax}\sin\omega_{gen}t_{\max} = \frac{\omega_{RC}v_{genMax}}{\omega_{RC}^2 + \omega_{gen}^2}(\omega_{gen}e^{-\omega_{RC}t} - \omega_{gen}\cos\omega_{gen}t + \omega_{RC}\sin\omega_{gen}t)$$

Both conditions occur at a time $t_{max}$ defined by $$f(t_{max}) = -\omega_{RC}e^{-\omega_{RC}t_{max}} + \omega_{gen}\sin\omega_{gen}t_{max} + \omega_{RC}\cos\omega_{gen}t_{max} \equiv 0$$

This transcendental equation cannot be solved in closed form, but is resolved numerically using a Newton-Raphson iterative algorithm $$t_{\max,0} = 0.8T$$

$$f(t_{\max,i}) = -\omega_{RC}e^{-\omega_{RC}t_{\max,i}} + \omega_{gen}\sin\omega_{gen}t_{\max,i} + \omega_{RC}\cos\omega_{gen}t_{\max,i}$$

$$\left.\frac{df(t)}{dt}\right|_{t=t_{\max,i}} = \omega_{RC}^2 e^{-\omega_{RC}t_{\max,i}} + \omega_{gen}^2\cos\omega_{gen}t_{\max,i} - \omega_{RC}\omega_{gen}\cos\omega_{gen}t_{\max,i}$$

$$t_{\max,i+1} = t_{\max,i} - \frac{f(t_{\max,i})}{\left.\frac{df(t)}{dt}\right|_{t=t_{\max,i}}}$$

The algorithm iteratively improves the $t_{max,0}$ initial estimate of $t_{max}$ and is stopped after a few iterations when no significant changes are noted. Applying this algorithm to the example of FIG. 24, $t_{max,0}$ converges to a value of 1.227 msec with three iterations.

The peak voltage captured on the capacitor, $v_{cMax}$, is the voltage $v_c(t_{max})$ $$v_{cMax} = \frac{\omega_{RC}v_{genMax}}{\omega_{RC}^2 + \omega_{gen}^2}(\omega_{gen}e^{-\omega_{RC}t_{\max}} - \omega_{gen}\cos\omega_{gen}t_{\max} + \omega_{RC}\sin\omega_{gen}t_{\max})$$
$$= v_{genMax}\sin\omega_{gen}t_{\max}$$

and the energy captured on the capacitor is $$E_{cMax} = \frac{C}{2}v_{cMax}^2$$

The energy is maximized with respect to the capacitor value by scanning across a range of capacitor values using the following algorithm:

(1) define the value of $v_{genMax}$ and $T$ and $R_{source}$
(2) initialize $E_{cMax} = 0$
(3) select a value of $C_{test}$ from the range of interest.
(4) calculate $$\omega_{RC} = \frac{1}{R_{source}C_{test}}$$

$$\omega_{gen} = \frac{\pi}{T}$$

(5) calculate $t_{max}$ using $$t_{\max,0} = 0.8T$$

$$f(t_{\max,i}) = -\omega_{RC}e^{-\omega_{RC}t_{\max,i}} + \omega_{gen}\sin\omega_{gen}t_{\max,i} + \omega_{RC}\cos\omega_{gen}t_{\max,i}$$

$$\left.\frac{df(t)}{dt}\right|_{t=t_{\max,i}} = \omega_{RC}^2 e^{-\omega_{RC}t_{\max,i}} + \omega_{gen}^2\cos\omega_{gen}t_{\max,i} - \omega_{RC}\omega_{gen}\cos\omega_{gen}t_{\max,i}$$

$$t_{\max,i+1} = t_{\max,i} - \frac{f(t_{\max,i})}{\left.\frac{df(t)}{dt}\right|_{t=t_{\max,i}}}$$

(6) calculate $$v_{cCapture} = \frac{\omega_{RC}\omega_{gen}v_{genMax}}{\omega_{RC}^2 + \omega_{gen}^2}\left(e^{-\omega_{RC}t_{\max}} - \cos\omega_{gen}t_{\max} + \frac{\omega_{RC}}{\omega_{gen}}\sin\omega_{gen}t_{\max}\right)$$

(7) calculate $$E_{cCapture} = \frac{C_{test}}{2}v_{cCapture}^2$$

(8) if $E_{cCapture} > E_{cMax}$ then $E_{cMax} = E_{cCapture}$ and $C_{optimal} = C_{test}$
(9) repeat step (3) until the capacitance range is exhausted To illustrate, begin with a somewhat arbitrary set of parameters representing the signals at 10 mph on a 12" radius tire with a 4" contact patch length and an $R_{source} = 1$ ohm $$v_{genMax@10\ mph} = 2V$$

$$T_{10\ mph} = 6\ msec$$

and scale up to 20, 40, and 80 mph by scaling the voltage upward and the pulse width downward with speed $$v_{genMax@20\ mph} = 4V$$

$$T_{20\ mph} = 3\ msec$$

$$v_{genMax@40\ mph} = 8V$$

$$T_{40\ mph} = 1.5\ msec$$

$$v_{genMax@80\ mph} = 16V$$

$$T_{80\ mph} = 0.75\ msec$$

Figure 25:
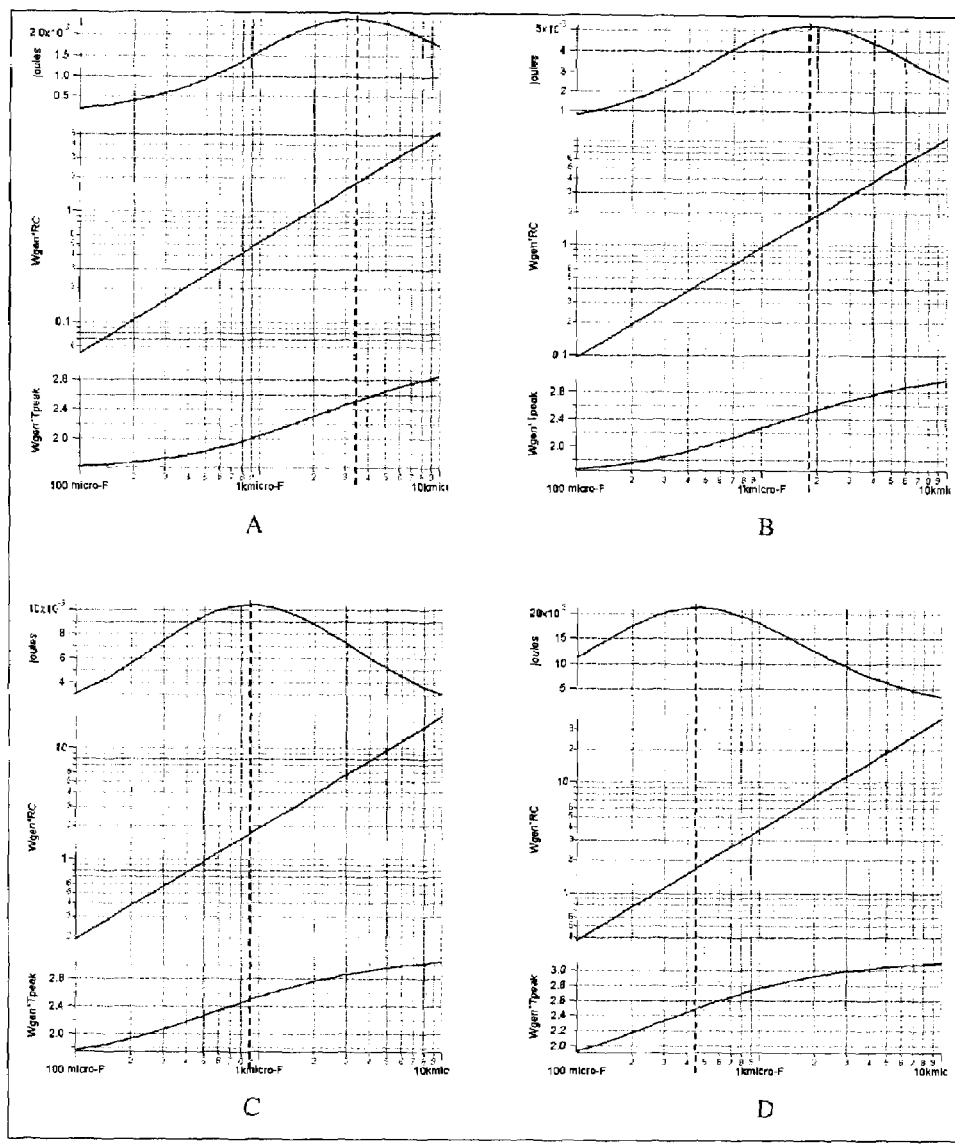
FIG. 25 is a graphical plot of $E_{cMax}$ (joules), $\omega_{gen}R_{source}C$ and $\omega_{gen} t_{max}$ for (A) T =6 msec, $v_{genMax}$=2 volts, $R_{source}$=1 ohm; (B) T =3 msec, $v_{genMax}$=4 volts, $R_{source}$=1 ohm; (C) T=1.5 msec, $v_{genMax}$=8 volts, $R_{source}$=1 ohm; (D) T =0.75 msec, $v_{genMax}$=16 volts, $R_{source}$=1 ohm.

The results of applying the optimization algorithm are presented in Graph 5. The optimal capacitor values that maximize the captured energy range from 3200 μF at 10 mph to 450 μF at 80 mph. Also shown on FIG. 25 are two factors, $\omega_{gen} R_{source} C$ and $\omega_{gen} t_{max}$, which are further considered below.

Determining the Theoretical Conditions for Optimality: At the peak energy capture points in all these figures $$\omega_{gen} R_{source} C_{optimal} \approx 1.7$$

$$\omega_{gen} t_{max} \approx 2.5$$

the conditions for optimality are found as those that make the partial derivatives of $E_c$ with respect to t and C equal zero. After some elementary calculus and algebra, the conditions are for the partial derivative with respect to t to be zero at $t_{max}$ and $C_{optimal}$ $$\omega_{gen} R_{source} C_{optimal} \sin \omega_{gen} t_{max} - e^{-t_{max}/R_{source} C_{optimal}} = 0$$

for the partial derivative with respect to C to be zero at $t_{max}$ and $C_{optimal}$ $$e^{-t_{max}/R_{source} C_{optimal}} \{[3-(\omega_{gen} R_{source} C_{optimal})^2]\omega_{gen} t_{max}\} - ]3 - (\omega_{gen} R_{source} C_{optimal}\cos \omega_{gen} t_{max} + [1 - 3(\omega_{gen} R_{source} C_{optimal})^2]\sin \omega_{gen} t_{max} = 0$$

These equations are re-written as $$\alpha \sin \beta + \cos \beta - e^{-\beta/\alpha} = 0$$

$$[(3-\alpha^2)\alpha + 2(1+\alpha^2)\beta]e^{-\beta/\alpha} - (3-\alpha^2)\alpha \cos \beta + (1-3\alpha^2)\sin \beta = 0$$

where the α and β constants are related to the model as $$\alpha = \omega_{gen} R_{source} C_{optimal}$$

$$\beta = \omega_{gen} t_{max}$$

It is apparent that these are two purely parametric simultaneous equations depend only on the constant parameters α and β that are not functions of time. Solving the equations numerically $$\alpha = \omega_{gen} R_{source} C_{optimal} = 1.7105$$

$$\beta = \omega_{gen} t_{max} = 2.4949$$

Importantly, these are the same values detected in the numerical experiments shown on FIG. 25.

Using the Optimality Conditions: Using these results, an optimum energy capture circuit has $$\omega_{gen} = \frac{\pi}{T}$$

$$C_{optimal} = \frac{1.7105}{\omega_{gen} R_{source}}$$

$$v_{cMax} = v_{genMax} \sin(\omega_{gen} t_{max})$$

$$= v_{genMax} \sin(2.4949)$$

$$= 0.603 v_{genMax} \text{ meaning 60\% of}$$

the peak voltage is captured $$E_{cMax} = \frac{C_{optimal}}{2} v_{cMax}^2$$

$$= 0.363 \frac{C_{optimal}}{2} v_{genMax}^2 \text{ meaning 36\%}$$

of the peak energy is captured $$= 0.363 \frac{1.7105}{2\omega_{gen} R_{source}} v_{genMax}^2$$

$$= 0.310 \frac{v_{genMax}^2}{\omega_{gen} R_{source}}$$

$$t_{max} = \frac{2.4949}{\omega_{gen}}$$

$$= \frac{2.4949}{\pi} T$$

$$= 0.7942 T$$

These relationships provide a way to design the energy capture electronics based only on the pulse width of the internally generated voltage pulse.

Since the $v_{genMax}$ is reasonably proportional to tire rotation rate (the motion of the magnet relative to the coil increases linearly with this rate), and $\omega_{gen}$ is also reasonably proportional to tire rotation rate ($f_{tireRotation}$), the energy captured per pulse is proportional to the tire rotation rate $$v_{genMax} = k_{vgen/tireRotationRate} f_{tireRotation}$$

$$\omega_{gen} = k_{\omega gen/tireRotationRate} f_{tireRotation}$$

$$E_{cMax} = 0.130 \frac{(k_{vgen/tireRotationRate} f_{tireRotation})^2}{(k_{\omega gen/tireRotationRate} f_{tireRotation}) R_{source}} \propto f_{tireRotation}$$

where the symbol ∝ indicates proportionality.

The power in Watts drawn from the capacitor is $$P_c = f_{tireRotation} E_{cMax}$$

$$= 0.310 \frac{f_{tireRotation}}{\omega_{gen} R_{source}} v_{genMax}^2 \propto f_{tireRotation}^2$$

In general, a doubling of the tire rotation rate will cause a quadrupling of power.

The actual power available to the circuitry depends on the efficiency of the power conversion circuitry. The voltage on the capacitor may have to be increased or decreased using a switching power regulator 54 before it is useable to run circuitry or charge a battery. Switching power regulators are readily available in surface mount packages from many vendors and have efficiencies of 80% depending on the peak voltage on the capacitor. The useable power after the regulator is $$P_{useable} = k_{converterEfficiency} P_c$$

$$= \frac{0.310 k_{converterEfficiency} f_{tireRotation}}{\omega_{gen} R_{source}} v_{genMax}^2$$

$$= \frac{0.310 k_{converterEfficiency} f_{tireRotation} v_{genMax}^2}{k_{\omega gen/tireRotationRate} f_{tireRotation} R_{source}}$$

$$= \frac{0.310 k_{converterEfficiency} v_{genMax}^2}{k_{\omega gen/tireRotationRate} R_{source}}$$

$$= \frac{0.310 k_{converterEfficiency} v_{genMax}^2 d_{wire}^2}{k_{\omega gen/tireRotationRate} 6.88 \times 10^{-8} n_{coil} d_{magnet} [1 + 0.00393(T - 20°\text{ C.})]}$$

$$= \frac{0.310 k_{converterEfficiency} d_{wire}^2 (\pi n_{coil} d_{magnet}^2 \dot{B}_{magnetMax})^2}{16 k_{\omega gen/tireRotationRate} 6.88 \times 10^{-8} n_{coil} d_{magnet} [1 + 0.00393(T - 20°\text{ C.})]}$$

$$= \frac{0.310 k_{converterEfficiency} d_{wire}^2 \pi^2 n_{coil} d_{magnet}^3 \dot{B}_{magnetMax}^2}{16 k_{\omega gen/tireRotationRate} 6.88 \times 10^{-8} [1 + 0.00393(T - 20°\text{ C.})]}$$

Further, since the rate of change of the magnetic B field is reasonably proportional to the tire rotation rate, $$\dot{B}_{magnetMax} = k_{Bdot/tireRotationRate} f_{tireRotation}$$

$$P_{useable} = \frac{0.310 k_{converterEfficiency} \; d_{wire}^2 \pi^2 n_{coil} d_{magnet}^3 k_{Bdot/tireRotationRate}^2 f_{tireRotation}^2}{16 k_{\omega gen/tireRotationRate} 6.88 \times 10^{-8} [1 + 0.00393(T - 20°\text{ C.})]}$$

$$= \frac{0.310 k_{converterEfficiency} \pi^2 k_{Bdot/tireRotationRate}^2}{16 k_{\omega gen/tireRotationRate} 6.88 \times 10^{-8} [1 + 0.00393(T - 20°\text{ C.})]} d_{wire}^2 d_{magnet}^3 n_{coil} f_{tireRotation}^2$$

$$= 2.78 \times 10^6 \frac{k_{converterEfficiency} k_{Bdot/tireRotationRate}^2}{k_{\omega gen/tireRotationRate} [1 + 0.00393(T - 20°\text{ C.})]} d_{magnet}^3 d_{wire}^2 f_{tireRotation}^2 n_{coil}$$

The values of the $k_{\omega gen/tireRotationRate}$ and $k_{Bdot/tireRotationRate}$ are determined, experimentally or by simulation, from the coil voltage response versus tire rotation rate. It is seen from this equation that the most sensitive system parameter is the magnet diameter which increases power by its cube; the next most sensitive parameters are the coil wire diameter and the tire rotation rate each of which increase power by their square; the least sensitive parameter is the number of turns of the coil, which increases power linearly with the number of turns.

The Capacitor: The optimal capacitor value is given by $$C_{optimal} = \frac{1.7105}{\omega_{gen} R_{source}}$$

$$= \frac{1.7105}{\pi R_{source}} T$$

$$= 0.5445 \frac{T}{R_{source}}$$

$$= \frac{1.71}{k_{\omega gen/tireRotationRate} f_{tireRotation} R_{source}}$$

$$= \frac{1.71 d_{wire}^2}{k_{\omega gen/tireRotationRate} f_{tireRotation} 6.88 \times 10^{-8} n_{coil} d_{magnet} [1 + 0.00393(T - 20°\text{ C.})]}$$

$$= \frac{2.49 \times 10^7}{k_{\omega gen/tireRotationRate} [1 + 0.00393(T - 20°\text{ C.})]} \frac{d_{wire}^2}{f_{tireRotation} n_{coil} d_{magnet}}$$

and the voltage rating it must accommodate as $$v_c = 0.603 v_{genMax}$$
$$= 0.603 \pi n_{coil} d_{magnet}^2 \dot{B}_{magnetMax}$$
$$= 0.603 \pi n_{coil} d_{magnet}^2 k_{Bdot/tireRotationRate} f_{tireRotation}$$
$$= 1.89 k_{Bdot/tireRotationRate} n_{coil} d_{magnet}^2 f_{tireRotation}$$

Laboratory Verification of Optimality: The optimality conditions are experimentally verifiable. A single 22V peak-to-peak sinusoidal cycle (11 volt $v_{genMax}$) was used to drive a 1000 ohm 1% resistor in series with a 1N4006 diode to which various capacitors were attached. The in-circuit capacitance was measured using a WaveTek DM27SXT meter, a single sinusoidal cycle was applied, the peak-captured voltage was measured, and the captured energy calculated. Two examples are shown in FIG. 26, a 300-Hz sine and a 600-Hz sine.

For the 300-Hz sine example, T=1.67 msec, $v_{gen}$=10.4 volts (after subtracting the 0.6V forward drop of the diode), and the expected optimal capacitor is $$C_{optimal} = \frac{1.7105}{\omega_{gen} R_{source}} = \frac{1.7105}{2\pi f_{gen} R_{source}}$$
$$= \frac{1.7105}{2\pi(300)(1000)} = 0.91 \, \mu F$$

Figure 26:
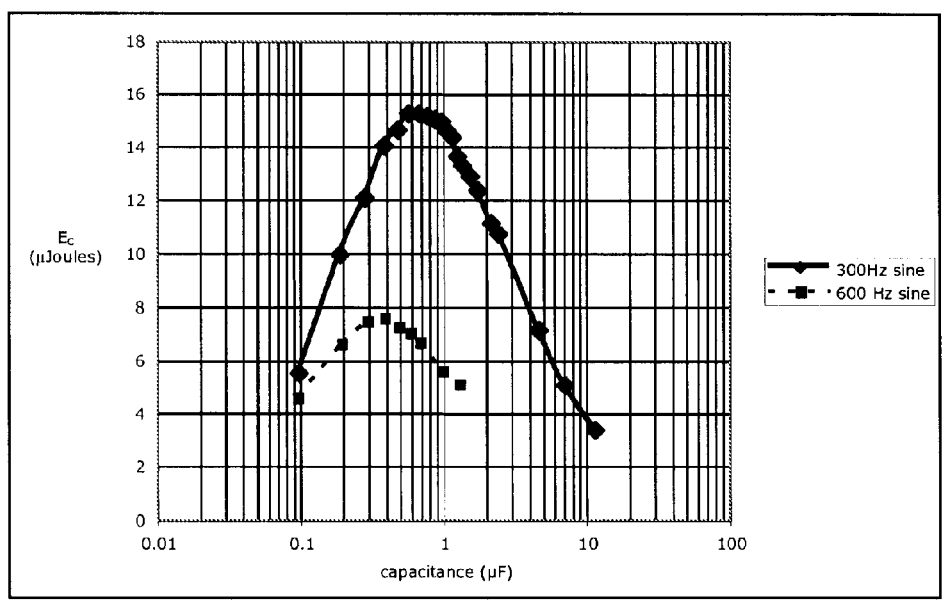
FIG. 26 is a graph showing experimental verification of the optimal capacitor calculation for a 300-Hz and a 600-Hz sine.

From FIG. 26, the peak occurs between 0.7-1.0 μF; at 0.8 μF the captured peak, $v_{cMax}$, is 6.24V (59% of $v_{genMax}$); $t_{max}$=1.34 msec (80% of T); and the captured energy is 15.2 μJ as compared to the anticipated energy $$E_{cMax} = 0.363 \frac{C_{optimal}}{2} v_{genMax}^2$$
$$= 0.181 C_{optimal} v_{genMax}^2$$
$$= 0.181(0.8 \times 10^{-6})(10.4)^2$$
$$= 15.6 \, \mu Joules$$

All calculated values are in agreement with the optimal conditions.

For the 600-Hz sine example, T=0.833 msec, $v_{gen}$=10.6 volts (after subtracting the 0.6V forward drop of the diode) the expected optimal capacitor is $$C_{optimal} = \frac{1.7105}{2\pi(600)(1000)} = 0.45 \, \mu F$$

From the graph in FIG. 26, the peak occurs between 0.3-0.5 μF; at 0.4 μF the captured peak, $v_{cMax}$, is, again, 6.24V (59% of $v_{genMax}$); $t_{max}$=0.676 msec (81% of T); and the captured energy is 7.7 μJ as compared to the anticipated energy $$E_{cMax} = 0.181 C_{optimal} v_{genMax}^2$$
$$= 0.181(0.4 \times 10^{-6})(10.4)^2$$
$$= 7.8 \, \mu Joules$$

Again, all calculated values are in agreement with the anticipated optimal conditions.

Determining Pulse Width: Practically, the internal voltage pulse, $v_{gen}$, is not accessible when the voltage capture circuit is in use; only the $v_{coil}$ signal is measurable. However, if the pulse capture circuit is temporarily disconnected and the coil unloaded, $v_{gen}$=$v_{coil}$ and the pulse width of $v_{gen}$ is that of $v_{coil}$ and can be determined. The unloading of the coil need only be performed occasionally to monitor slowly changing conditions. Note that if a positive pulse half-wave rectifier is used, the associated negative pulse is automatically unloaded by the rectifier 52 and can be used for determining pulse width.

One method of determining pulse width from an unloaded positive (or negative) pulse is by setting a threshold level, $v_{threshold}$, and measuring the time, τ, during which the pulse is greater (or less) than the threshold, as shown in FIG. 23. The peak voltage, $v_{genMax}$, is measured during this timing process and the pulse width determined as $$v_{threshold} = v_{genMax} \cos\left(\frac{\pi}{T}\frac{\tau}{2}\right)$$
$$\therefore T = \frac{\pi}{2\cos^{-1}(v_{threshold}/v_{genMax})}\tau$$

Figure 7:
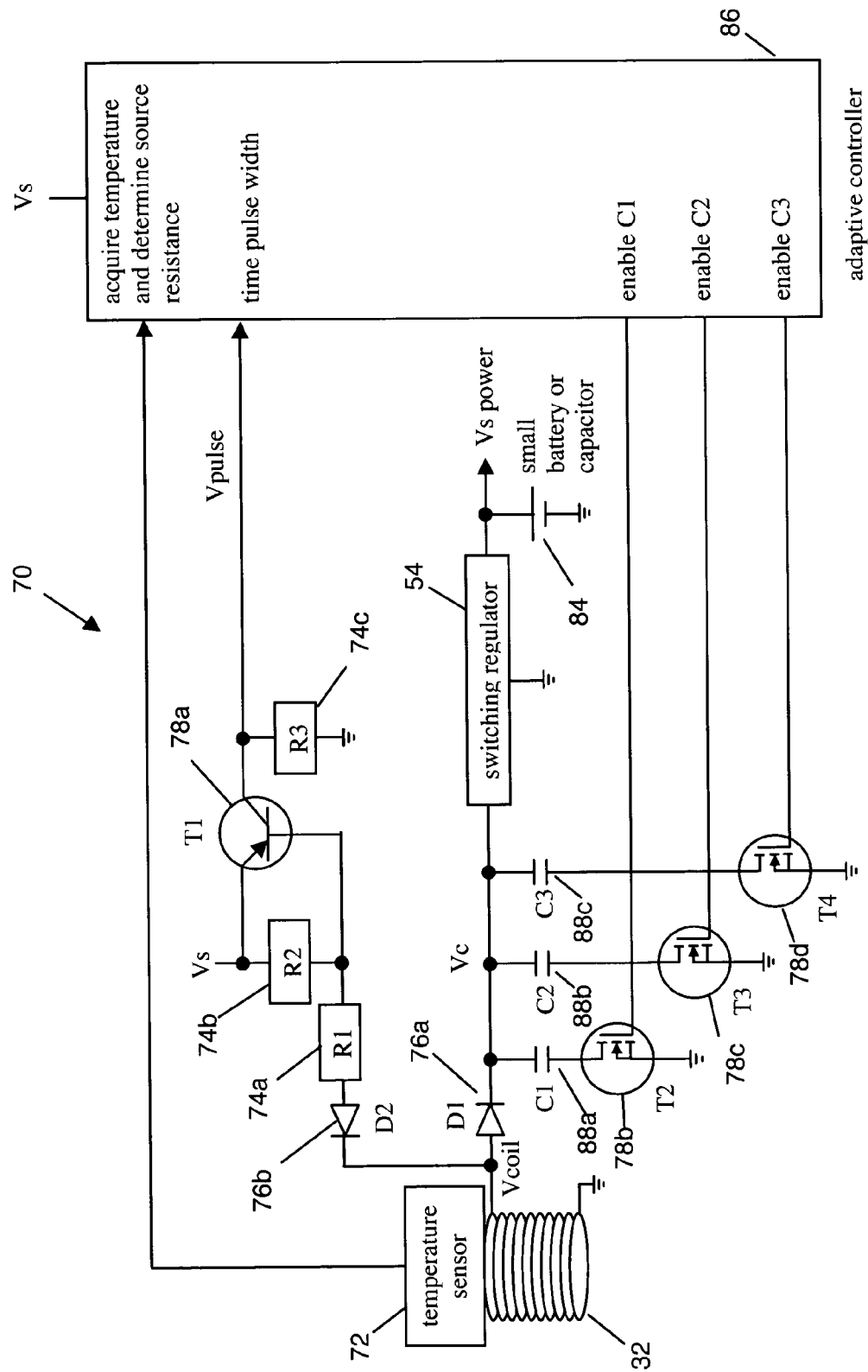
FIG. 7 is a schematic of an adaptive energy capture circuit depicting the measurement of coil temperature and of pulse width to select, using solid state switches, an optimal capture capacitor or combination of capacitors.

Other methods of determining pulse width are described in the following circuitry discussion Adaptive Energy Capture Circuitry: Since the optimal capacitor is easily calculated as a little more than half the ratio of the pulse width to the source resistance, the optimal capacitor is selected from a bank of capacitors accordingly. FIG. 7 illustrates a circuit 70 that implements this optimization and selection function. A backup battery 84 (or a storage capacitor) powers the electronics with a supply voltage $v_s$ and is itself charged by the positive $v_{coil}$ pulse captured on capacitors 88a, 88b, and 88c through the rectifier 76a. The rectifier 76b passes the negative $v_{coil}$ pulse to turn on and saturate pass transistor 78a as biased by resistors 74a and 74b. The output of transistor 78a, referenced to ground by resistor 74c, is a positive signal $v_{pulse}$, with time width equal to the pulse width of the negative $v_{coil}$ pulse. The controller 86 times the duration of $v_{pulse}$ and, using a sensor 72 to measure the coil temperature to estimate the source resistance, determines the ratio of the pulse width to the source resistance and multiplies this result by 0.5445 to calculate $C_{optimal}$. The adaptive controller 86 determines the combination of capacitors 88a, 88b and 88c closest to $C_{optimal}$ and enables that combination by turning on the appropriate transistors 78b, 78c, and 78d.

Figure 27:
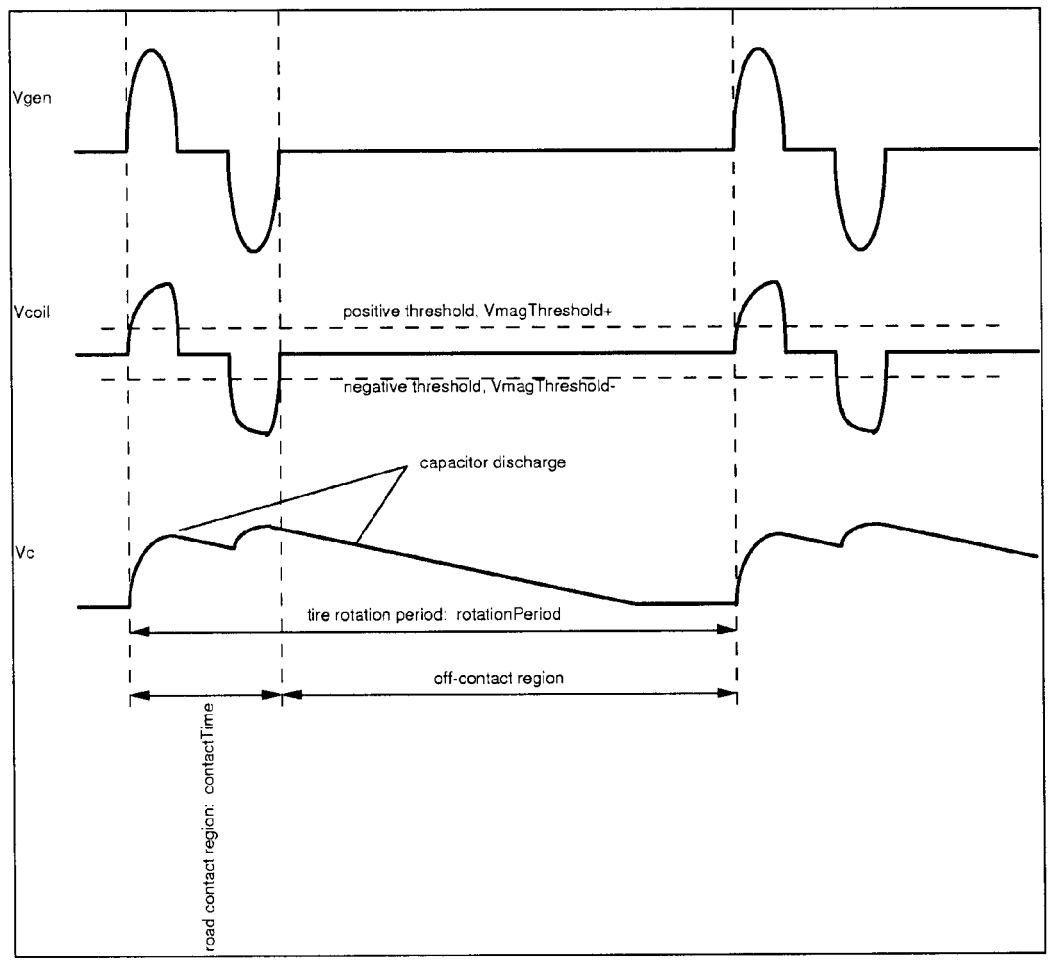
FIG. 27 is a graphical plot of the magnet-coil generator circuit voltages vs. time with $v_{gen}$ the internal coil voltage, $v_{coil}$ the external measurable coil voltage, and $v_c$ the capture capacitor voltage after full-wave rectification of $v_{coil}$ and during discharge; also shown is the relationship of the signals to the off- and on-road contact status of the tire as well as threshold settings used to measure the $v_{coil}$ pulse widths and periodicity.

The early positive going pulse is used to capture energy and the negative pulse is used to determine pulse width. It may seem wasteful not to use the negative pulse for energy, but this second pulse is useful only during its portion having a voltage greater than that already captured on the capacitor by the first pulse (the upper 40% if the optimal capacitor is being used) and does not contribute nearly as much energy as the first pulse. FIG. 27 illustrates the pertinent circuit voltages assuming a full-wave rectifier is used and that the energy capture capacitor is fully discharged by the switching regulator between cycles.

Alternatively, the adaptive capture circuit 70 may be designed to use the negative pulse for power and the positive pulse for measuring pulse width.

Alternatively, the adaptive capture circuit 70 may be designed to use both the positive and negative pulses for power and, occasionally, monitor pulse width by unloading the coil 32 by occasionally disconnecting all capacitors 88a, 88b and 88c Returning to the examples of FIG. 25, the capacitance range can be handled with three capacitors of values 500F, 1000 µF and 2000 µF that, in combination, provide seven capacitance values ranging from 500 µF to 3500 µF in 500 µF steps, in addition to no capacitance loading.

Figure 8:
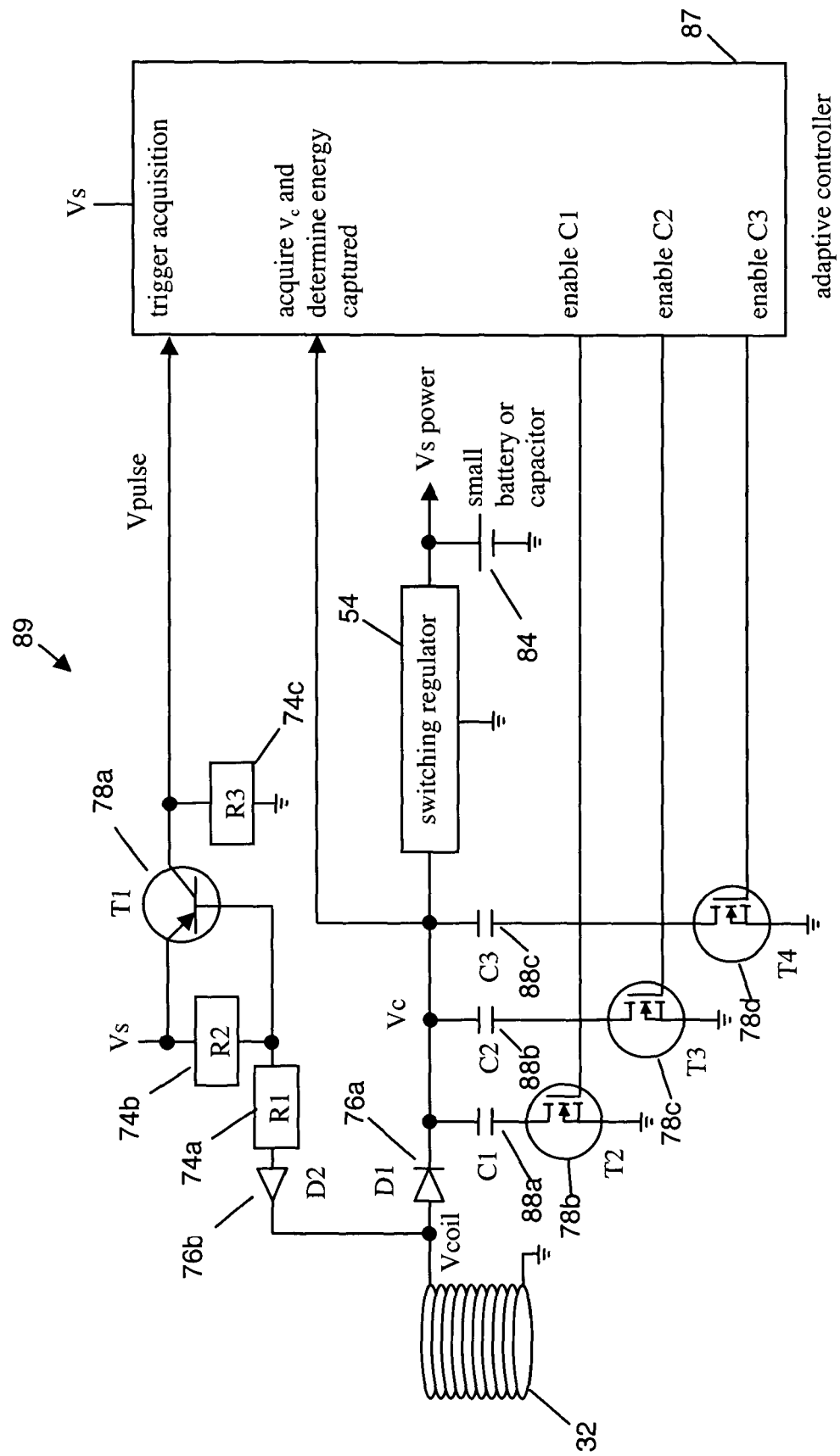
FIG. 8 is a schematic of an adaptive energy capture circuit depicting the measurement of captured voltage to select, using solid state switches, an optimal capture capacitor or combination of capacitors.

Other alternate methods can be used to select the optimal capacitor. As suggested by FIG. 25, the capacitor value can be dithered and the resulting acquired energy calculated to track the optimal capacitor value. For example, consider that when using a nominal capacitance $C_0$ the captured voltage on the capacitor (as determined for example by A/D conversion) is measured as $v_{c0}$ and the captured energy is calculated as $E_0 = C_0 v_{c0}^2 / 2$. The capacitor value is subsequently dithered (perturbed) by using a larger value, $C_+$, $v_{c+}$ measured and $E_+ = C_+ v_{c+}^2 / 2$ calculated. If the energy is greater using $C_+$ then switch to this capacitor value. Otherwise use a smaller capacitor, $C_-$ and see if it provides more energy. A dither controller, is shown in FIG. 8 and is very similar to that of FIG. 7. The rising edge of the pass transistor 78a signal indicates the negative $v_{coil}$ pulse has arrived and that the positive pulse has ended. That occurrence indicates the voltage on the capacitor bank 88a, 88b, and 88c is to be measured and used to calculate the energy captured.

At high wheel rotation speeds, where available power is greatest and high coil voltages are generated, a sub-optimal capacitor value is used to reduce the voltage captured to a range acceptable to the regulator. For this a capacitor combination larger the $C_{optimal}$ is selected.

Figure 9:
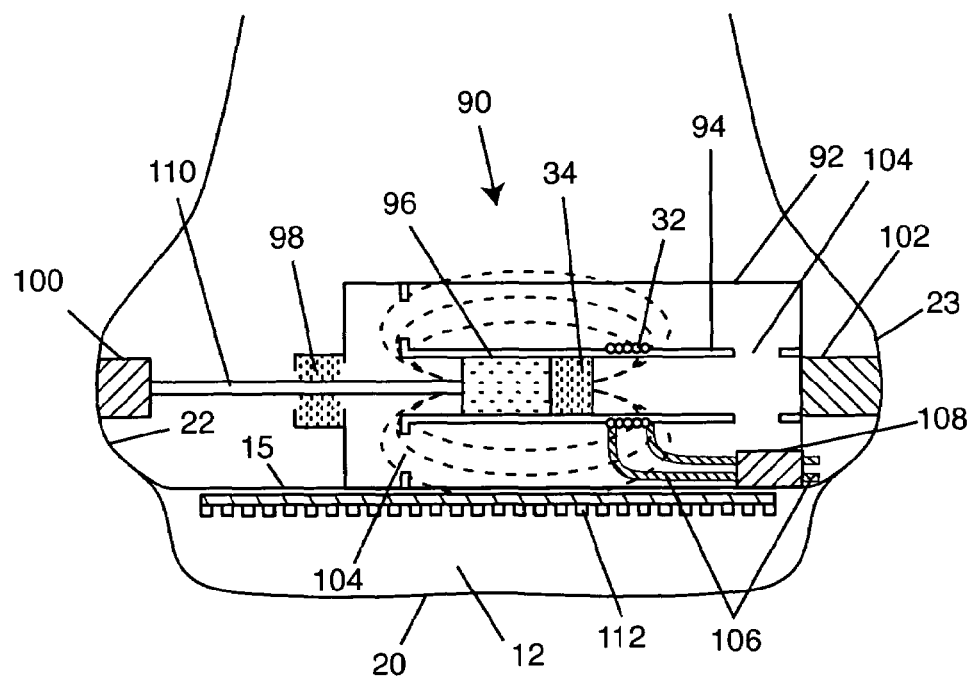
FIG. 9 is a side cutaway view of a horizontal magnet-coil inner wall deflection generator showing its construction, mounting, and how it responds to inner wall deflection motion within a tire when the generator is located on the road contact region.
Figure 9A:
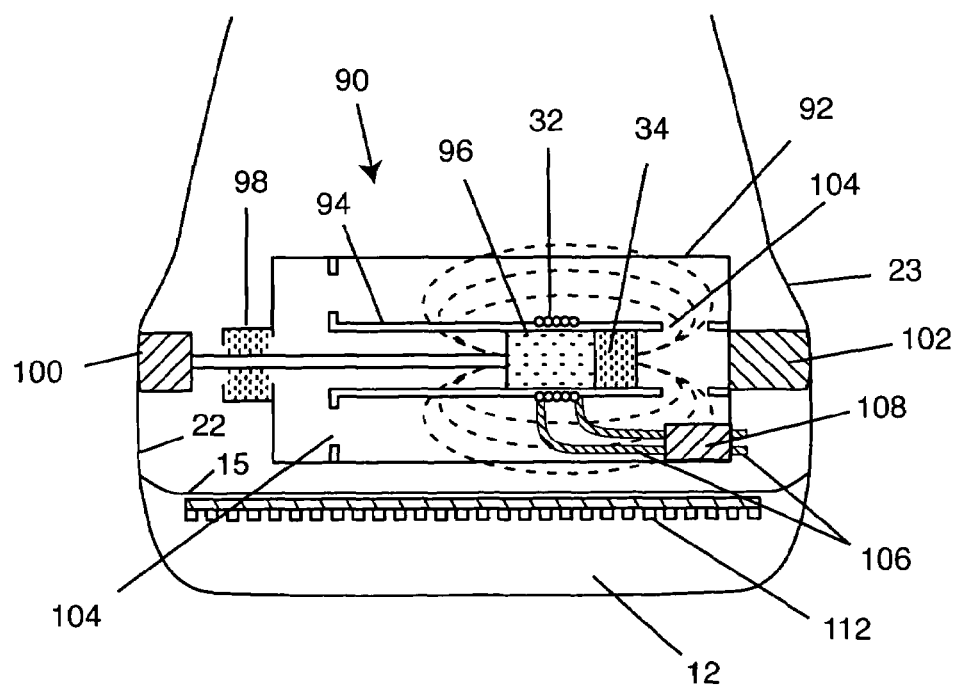
FIG. 9A is a side cutaway view of a horizontal magnet-coil inner wall deflection generator showing its construction, mounting, and how it responds to inner wall deflection motion within a tire when the generator is located away from the road contact region.
Figure 10:
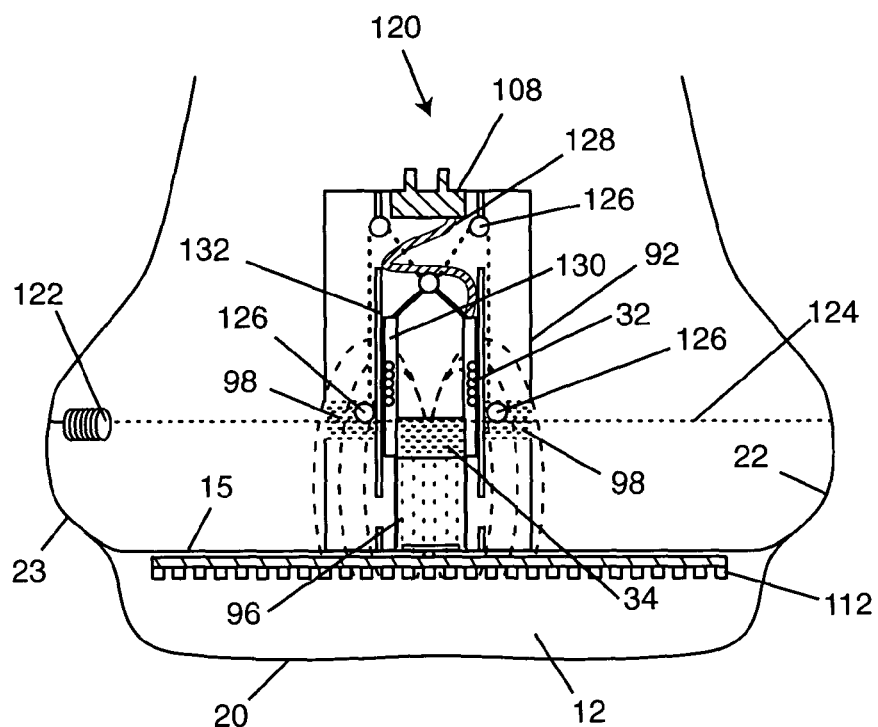
FIG. 10 is a side cutaway view of the radial magnet-coil inner wall deflection generator when it is located on the road contact region.
Figure 10A:
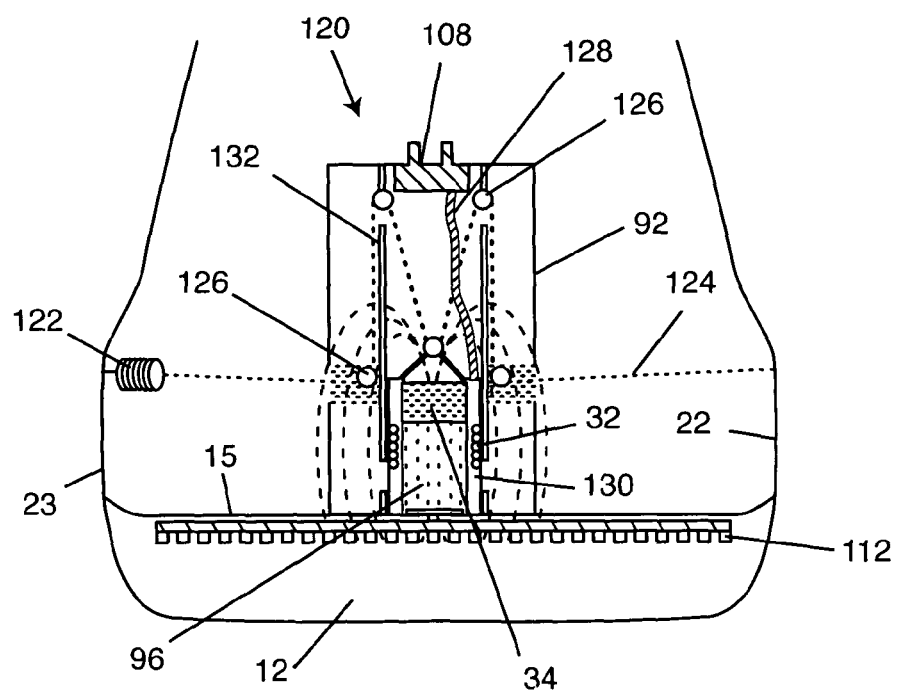
FIG. 10A is a side cutaway view of the radial magnet-coil inner wall deflection generator when it is located away from the road contact region.
Figure 11:
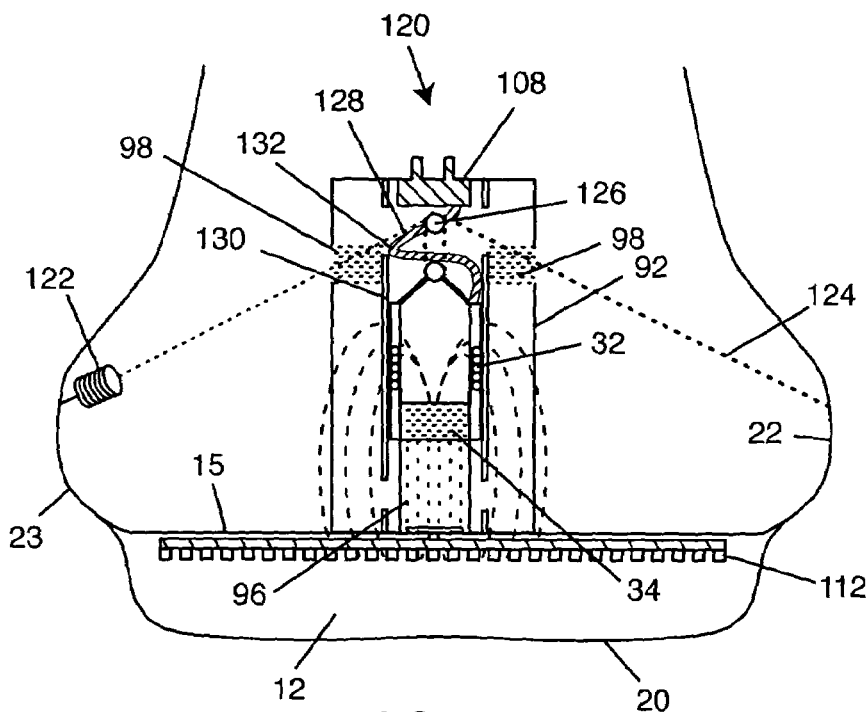
FIG. 11 is a side cutaway view of the radial magnet-coil inner wall deflection generator having a linkage with fewer slip rollers when the generator is located on the road contact region.
Figure 11A:
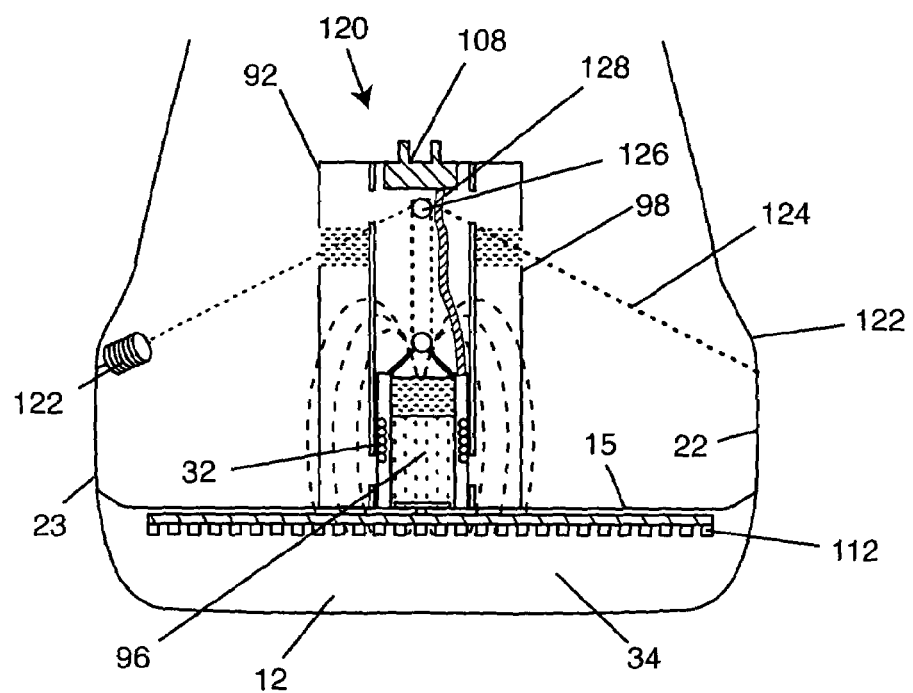
FIG. 11A is a side cutaway view of the radial magnet-coil inner wall deflection generator having a linkage with fewer slip rollers when the generator is located away from the road contact region.
Figure 12:
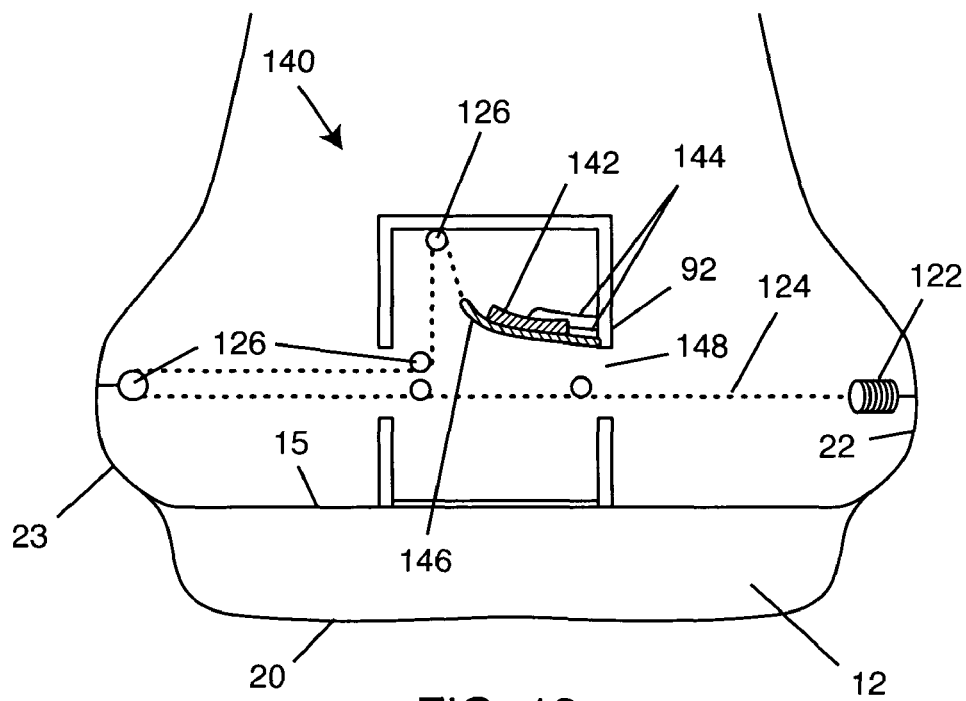
FIG. 12 is a side cutaway view of the radial piezo-electric inner wall deflection generator showing its construction, mounting, and how it responds to inner wall deflection motion within a tire when it is located on the road contact region.
Figure 12A:
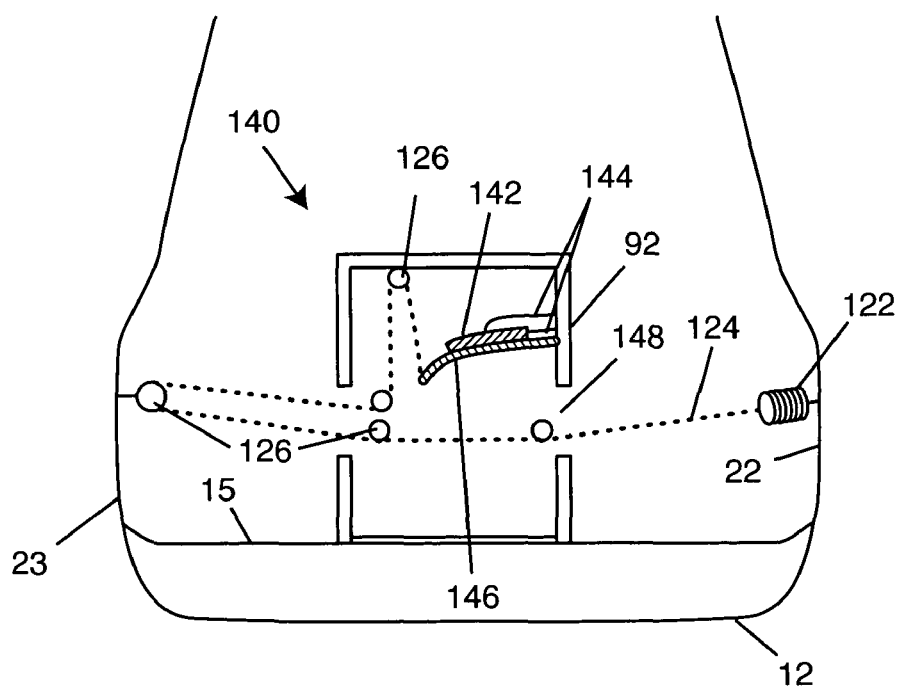
FIG. 12A is a side cutaway view of the radial piezoelectric inner wall deflection generator showing its construction, mounting, and how it responds to inner wall deflection motion within a tire when the generator is located away from the road contact region.
Figure 13:
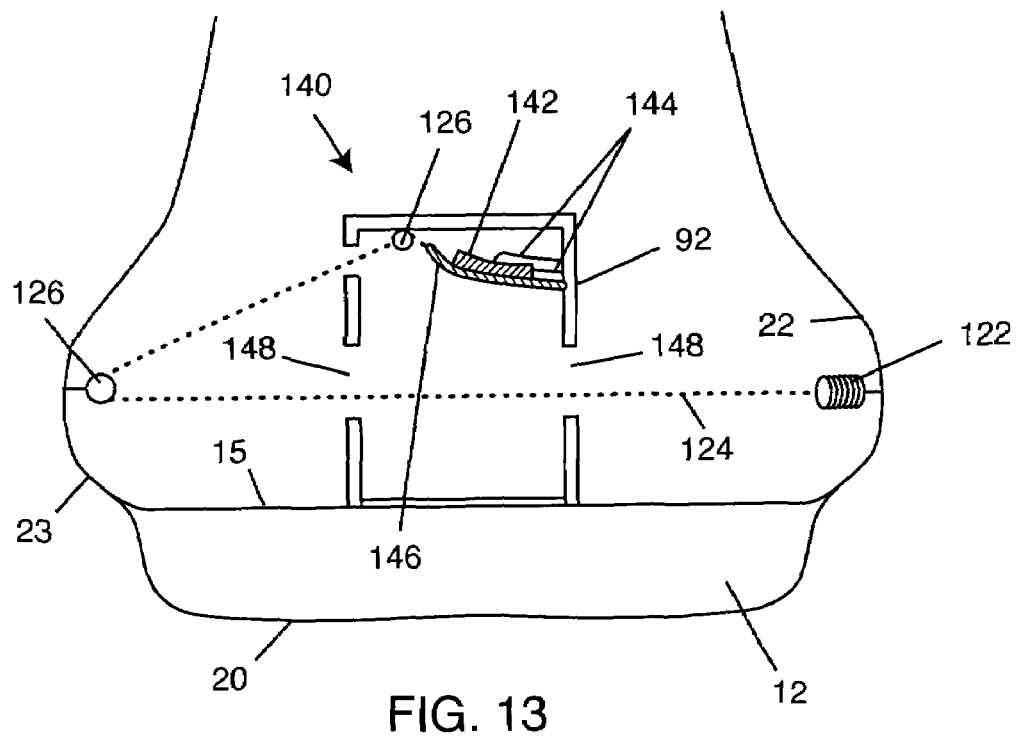
FIG. 13 is a side cutaway view of the radial piezo-electric inner wall deflection generator having simpler linkage with fewer slip rollers when the generator is located near the road contact region.
Figure 13A:
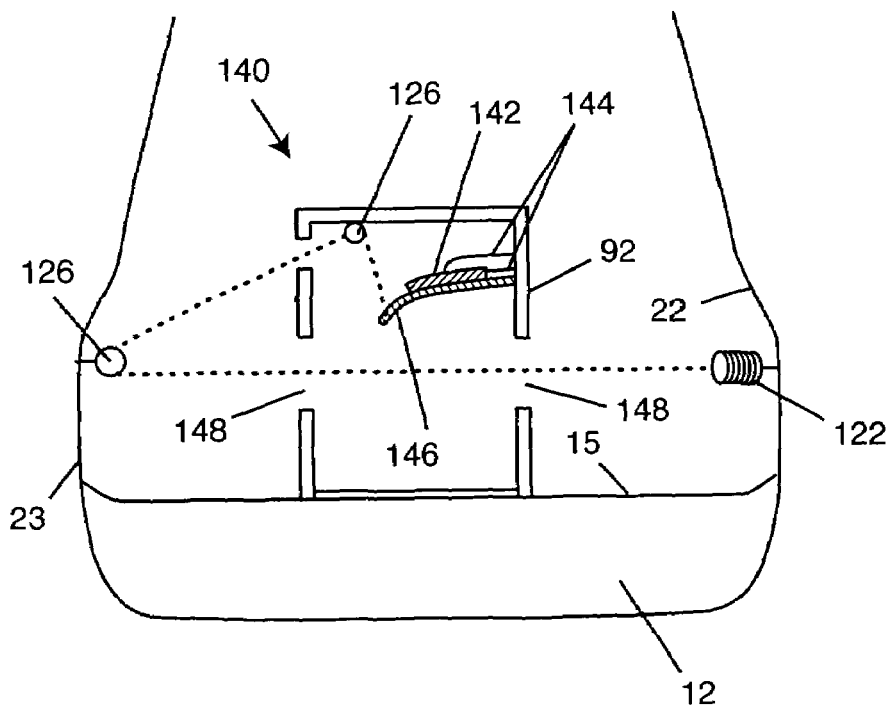
FIG. 13A is a side cutaway view of the radial piezo-electric inner wall deflection generator having simpler linkage with fewer slip rollers when the generator is located away from the road contact region.

Horizontal Generator: Energy is captured and electrical power generated from the reciprocating motion of the inner wall deflection tire action. One approach to energy capture and generation is illustrated in FIGS. 9 and 9A, which show a horizontally oriented magnet-coil generator 90. Fasteners 100 and 102 are attached to the opposing inner walls 22 at shoulder 23, and these fasteners move as the inner walls deflect. Each individual inner wall motion is synchronous with the other but opposite in direction where each is positioned outward from the tire when on the contact region 20, and returning inward to the tire when off the contact region 20. As the inner wall deflections come and go, fasteners 100 and 102 will fall and rise radially with respect to the rim 18 as well as move outward and inward. The motion of each inner wall 22 is summed by the mechanical construction and translated into relative motion of the coil 32 and the magnet 34 within chamber 92. The magnet 34 travels within a guide tube 94 around which the coil 32 is wrapped. Air passageways 104 are provided within the guide tube 94 to reduce air compression due to the pumping action, and a filter 98 is provided to keep contaminants from the dirty interior of the tire from entering the generator 90 and resisting the motion of the magnet 34 and slug 96 within guide tube 94. The adaptive energy capture circuit 108 is mounted within the generator 90 and electrical connections made internally and externally with fixed wires 106.

Alternatively, the horizontal generator is adhered to the tread inner surface 15 and couples to only one inner wall 22 at shoulder 23 as illustrated in FIG. 4, where the generator is generally indicated by the numeral 28. Such a horizontal generator requires a flexible linkage 29 (pushrod) to accommodate the rising and falling radial movement. Both inner walls can be coupled using two flexible linkages 29.

Figure 28:
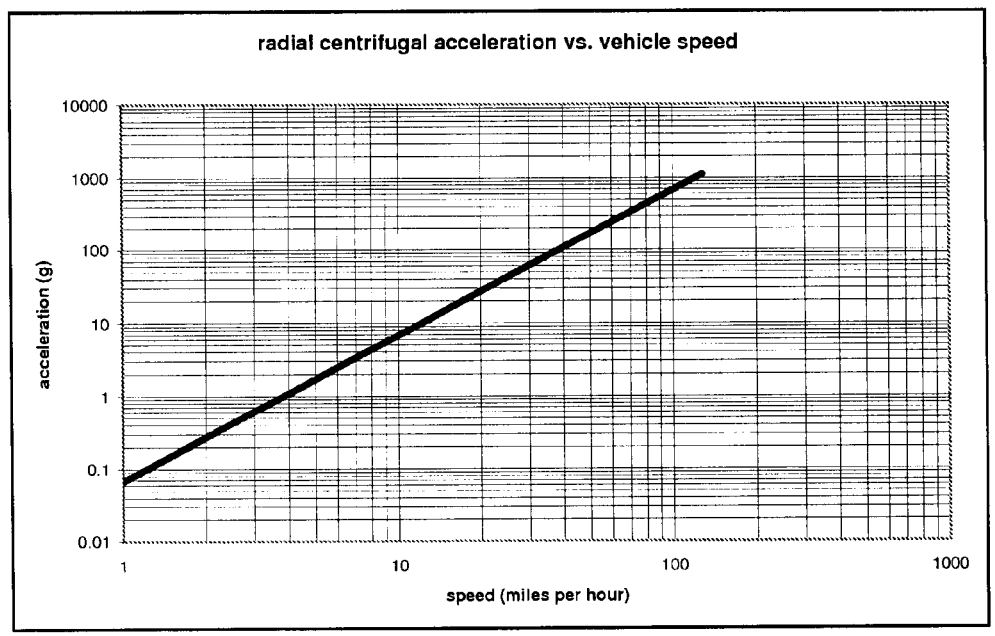
FIG. 28 is a graph of the centrifugal acceleration at the tread and as a function of vehicle speed for a typical 1-foot radius passenger tire.

The horizontal generator 90 is affected by centrifugal acceleration and the magnetic susceptibility of the tire steel belts 112. The rotating tire acts as a centrifuge and generates a large acceleration radially outward from the wheel rim center $$a_{centrifugal} = r_{tire} \omega_{tireRotation}^2$$
$$= r_{tire} \left( \frac{S_{vehicle}}{2\pi r_{tire}} \right)^2$$
$$= \frac{s_{vehicle}^2}{4\pi^2 r_{tire}}$$

where $s_{vehicle}$ is the speed of the vehicle and $r_{tire}$ the tire radius. This acceleration is illustrated in FIG. 28 for a typical 1 ft radius passenger tire, and places a large load on the fasteners 100 and 102 and on the guide tube 94 holding the magnet (e.g. 244 g's at 60 mph).

Unless shielded by mu-metal, the steel belts 112 within the tire tread 12 will attract the magnet 34 and induce more frictional force. The belts 112 also draw the magnetic flux toward them from both poles and alter the voltage generated by the coil 32.

Radial Generator: An alternate approach is to provide a radial magnet-coil generator 120 mounted radially within the tire 10 and move only the coil 32, as illustrated in FIGS. 10, 10A, 11 and 11A. The magnet 34 is fixed to the base of the generator chamber 92 and the chamber is mounted to the inner tread surface 15. In this configuration the magnetic pole nearest the tread is attracted to the steel belts 112 but the farther pole is mostly unaffected. A flexible linkage, illustrated by a cable 124, sums the motion of each inner wall 22 to drive the coil shuttle 130 within the guide tube 132; a stiff spring 122 strain relief is provided to take up slack in the cable 124 and to allow the inner wall deflection to exceed the motion limits of the generator 120; slip rollers 126 are provided to guide the cable 124. Filters 98 are provided to keep out contaminants.

As inner walls 22 move outward and toward the rim 18 as the contact region 20 is reached, the centrifugal force goes to zero and the cable 124 pulls the coil shuttle 130 towards rim 18 generating a voltage pulse. When inner walls 22 move back in and away from the rim 18 with the contact patch 20 removal, the centrifugal force is re-asserted, the linkage 124 relaxes, moves upward from the tread 15, and the centrifugal force pushes the coil shuttle 130 back toward the tread inner surface 15 to generate a second voltage pulse of opposite polarity from the first. The coil 32 is embedded within its shuttle 130 and electrical connections 128 are made between it and the adaptive energy capture circuit 108 using a flexible assembly shaped to share the space with the linkage, such as in the shape of a soft spring coiled about the inner periphery of the guide tube 132.

Alternatively, the radial generator can be coupled to only one inner wall 22 at shoulder 23 as illustrated in FIG. 4, where the generator is generally indicated by the numeral 28.

An exemplary demonstration of a radial generator illustrates the device. Built according to FIGS. 11 and 11A, the demonstrator consists of a 0.5" diameter×1.25" length magnet (Magnet Sales & Manuacturing #39HNERR32); a 0.625" diameter×0.65" length 1.1 ohm coil made up of 8 meters of #26 magnet wire wrapped onto three layers of 50 turns per layer; 20 lbs strength monofilament fishing line cable; and a pvc sprinkler pipe structure. The demonstrator is mounted using tire patches within a 12.1" radius passenger tire (Signet radial SV-820 135R14C) with distance between cable inner wall contact points of 7⅛" when uninflated and unmounted on the rim; 7½" when unloaded and inflated to 40 psi; and 7⅞" when loaded (rear right wheel of Volvo 240 with driver). The signal wires from the coil are routed outside of the tire using a second valve stem filled with epoxy; the wires are routed to external concentric circular copper patterns on copper clad printed circuit board material mounted to the wheel rim; a pair of brass brushes are attached to the vehicle fender that made contact with the copper patterns as the tire rotates; and the signals from the brushes are displayed on an oscilloscope.

Figure 29:
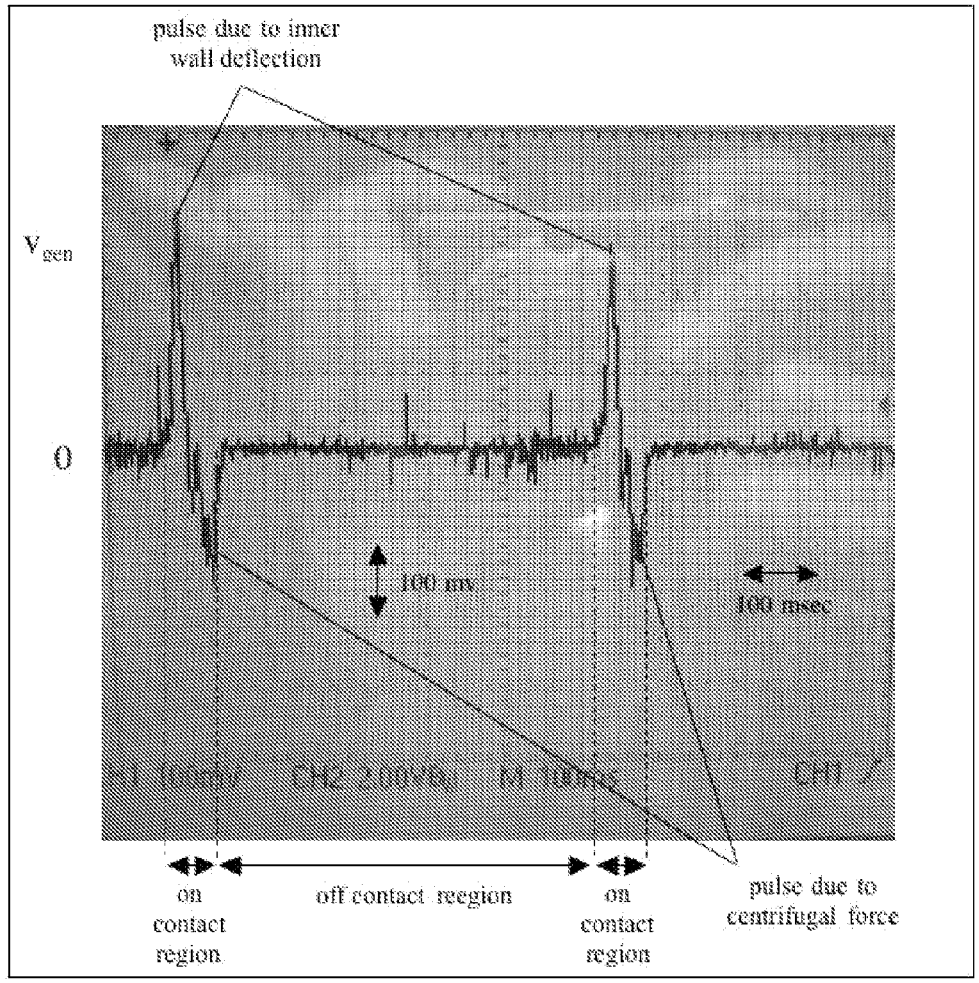
FIG. 29 is a graph of the voltage vs. time generated by a demonstration radial magnet-coil inner wall deflection generator.

A typical result taken from the demonstrator while the vehicle is moving at 8 mph is shown in FIG. 29. It consists of a positive leading edge pulse caused by the inner wall deflection pulling the coil upward, and a negative trailing edge pulse caused by a 4 g centrifugal force.

The half-sinusoidal positive leading edge pulse has a $v_{genMax}$=300 mv; T=30 msec; and is repeated every 540 msec. For such a signal, the optimal energy capture circuitry is $R_{source}$=1.1 ohm $C_{optimal}$=14,850 μF $v_{cMax}$=181 mv $E_c$=243 μJ $P_c$=0.45 mW Projecting from these values, if the vehicle were traveling at 40 mph, then $v_{genMax}$=1500 mv; T=6 msec; the pulse is repeated every 108 msec; the centrifugal force is 106 g; and $R_{source}$=1.1 ohm $C_{optimal}$=2970 μF $v_{cMax}$=0.905 v $E_c$=1215 μJ $P_c$=11.2 mW If the vehicle were traveling at 60 mph, then $v_{genMax}$=2.25 v; T=4 msec; the pulse is repeated every 72 msec; the centrifugal force is 239 g; and $R_{source}$=1.1 ohm $C_{optimal}$=2178 μF $v_{cMax}$=1.98 v $E_c$=1822 μJ $P_c$=25.3 mW If the diameter of the wire is halved (32 guage) and the number of turns is quadrupled (600 turns in 6 layers by 100 turns): the coil volume is unchanged; the resistance of the wire per unit length is quadrupled; the length of the wire is quadrupled; and the net resistance is sixteen times greater. As a result $v_{cMax}$ is quadrupled to help offset voltage drop in the rectifier; the capacitor is one-sixteenth in value; and the power is unchanged. At 40 mph this means $R_{source}$=17.6 ohm $C_{optimal}$=186 μF $v_{cMax}$=3.618 v $E_c$=1215 μJ $P_c$=11.2 mW Thereafter, doubling the number of layers doubles the resistance and doubles the power with half the capacitance: a 32-guage wire coil having 12 layers with 100 turns per layer will result in $R_{source}$=35.2 ohm $C_{optimal}$=92.8 μF $v_{cMax}$=7.236 v $E_c$=2430 μJ $P_c$=22.5 mW and 51 mw at 60 mph. More power can be generated by increasing the number of coils, the diameter of the magnet, etc.

A Piezo-Electric Generator

Another approach to power generation is to use a conventional piezo-electric device, rather than a magnet-coil, and couple it radially to the motion of the inner wall deflection as shown in FIGS. 12, 12A, 13 and 13A generally as numeral 140 and where a bending moment is applied to the piezo 142. Here an alternate form of the flexible linkage, again illustrated by a cable 124, couples the motions of the two inner walls 22 at shoulder 23 through access openings 148 and works to bend a leaf spring 146 on which is mounted the piezo 142. The bending motion causes the piezo 142 to generate an electric charge that is captured in a manner similar to that of the magnetic-coil induced pulse.

The spring 146 is bent towards the tread 12 when off of the road contact area by the centrifugal acceleration. The spring 146 is moved rapidly and forcefully toward rim 18 when on the contact region by the linkage 124 driven by the action of the inner wall deflection. As the contact region 20 is exited and the sidewalls 22 return to normal, the linkage 124 relaxes and the spring 146 and centrifugal force return the piezo 142 toward tread 12.

Filters are not needed to keep out contaminants, and large piezo-electric devices are used without regard to the mechanical resonance of their mounting since the inner wall deflection forcibly drives them.

The piezo 142 is formed of one or two layers of piezo-electric film such as PVDF (polyvinylidine flouride) or PZT (lead zirconium titanate) or any other suitable material. A two-layer bimorph piezo is constructed with oppositely polarized layers. As the spring is bent toward the piezo, layer #1 bonded to the spring is stretched and layer #2 bonded to layer #1 is compressed. Layer #1 increases its charge while layer #2 decreases. As the spring is bent away from the piezo, layer #1 is compressed and layer #2 is stretched.

Layer #1 decreases its charge while layer #2 increases. The electrical connections between the two layers can be series or parallel with the series connection generating the same charge but at half the voltage as the series.

Figure 14:
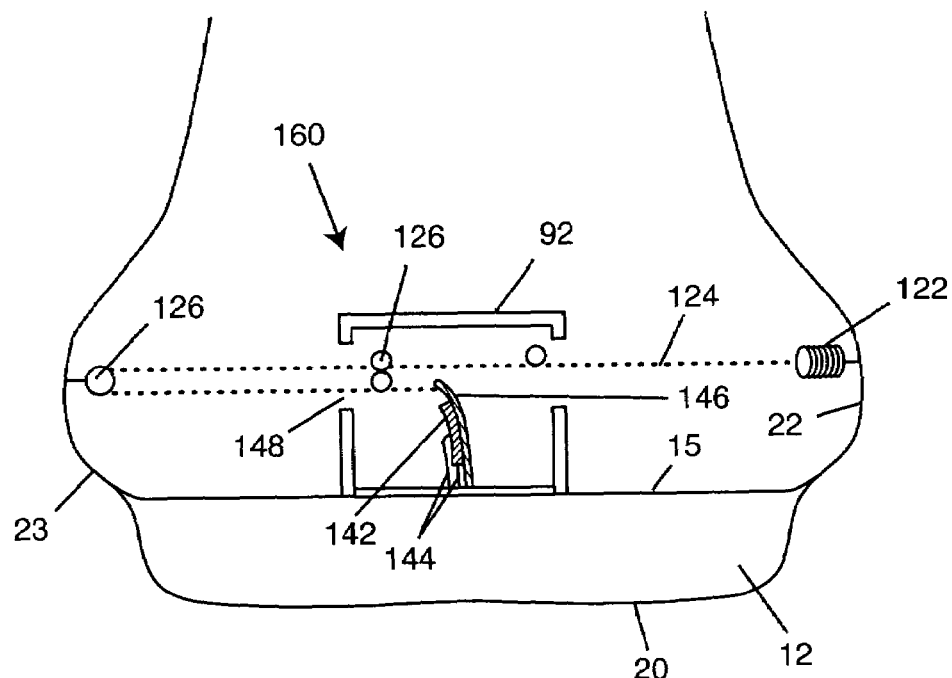
FIG. 14 is a side cutaway view of the horizontal piezo-electric inner wall deflection generator showing its construction, mounting, and how it responds to inner wall deflection motion within a tire when the generator is located on the road contact region.
Figure 14A:
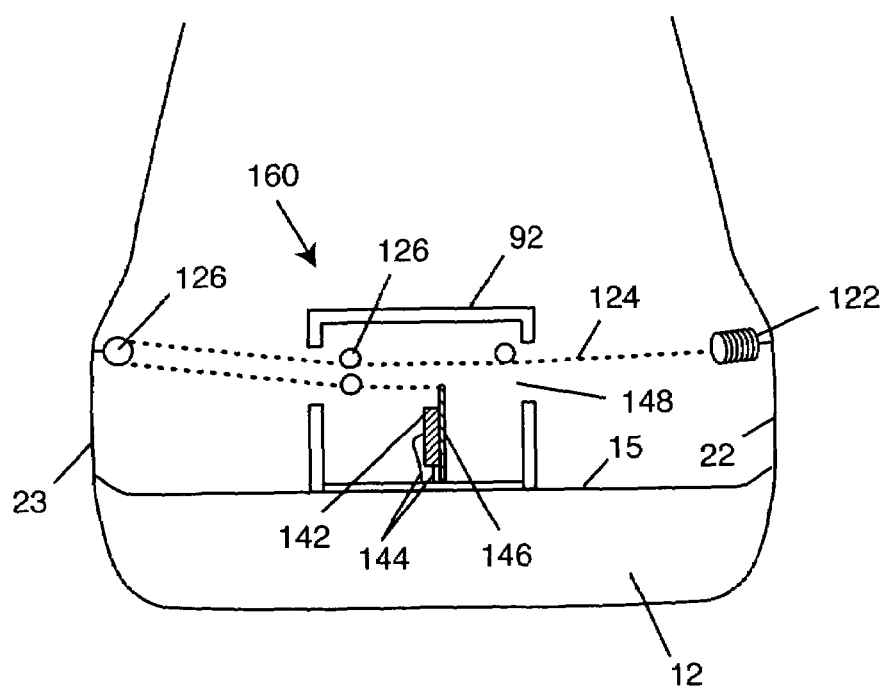
FIG. 14A is a side cutaway view of the horizontal piezo-electric inner wall deflection generator showing its construction, mounting, and how it responds to inner wall deflection motion within a tire when the generator is located away from the road contact region.

Since the piezo-electric generator is unaffected by the tire radial belts, and there is no friction to speak of, a horizontal version 160 is possible as shown in FIGS. 14 and 14A. With this configuration the neutral position is radial to the tire.

The charge produced by piezo 142 is proportional to the bending and thus to the deflection motion, $d_{deflection}$ $$Q_{piezo} = k d_{deflection}$$

Figure 15:
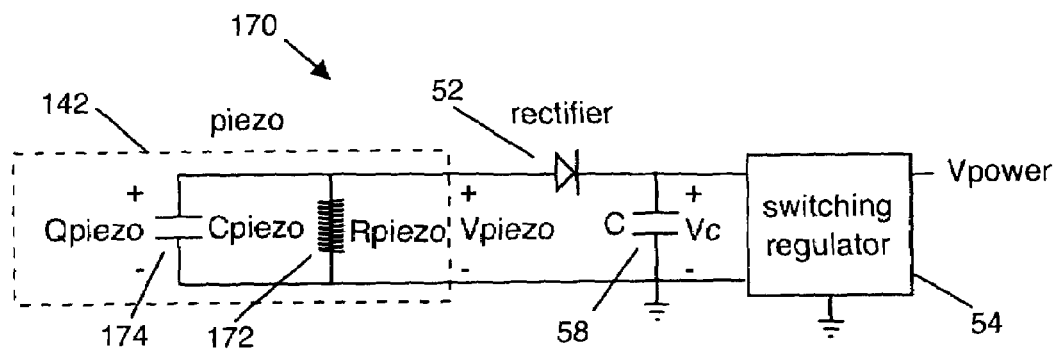
FIG. 15 is a schematic of the piezo-electric energy capture circuitry showing the piezo-electric transducer equivalent circuit model, the rectifier and peak capture diode, a voltage capture capacitor, and a switching regulator.

An equivalent circuit 170 of the piezo is shown in FIG. 15 with its charge generator ($Q_{piezo}$) and inherent capacitance 174 ($C_{piezo}$) and resistance 172 ($R_{piezo}$) attached to the charge capture electronics. With $R_{piezo}$ normally large and no significant source resistance, the charge generated by the piezo 142, $Q_{piezo}$, is distributed over the internal capacitance 174 and the capture capacitance 58 resulting in a captured voltage of $$v_c = \frac{Q_{piezo}}{C_{piezo} + C}$$
$$= \frac{k d_{deflection}}{C_{piezo} + C}$$

The energy captured is $$E_c = \frac{C}{2} v_c^2$$
$$= \frac{C}{2} \left( \frac{Q_{piezo}}{C_{piezo} + C} \right)^2$$
$$= \frac{C}{2} \left( \frac{k d_{deflection}}{C_{piezo} + C} \right)^2$$

which is maximized when $C = C_{optimal} = C_{piezo}$ producing $$E_{cMax} = \frac{1}{8} \frac{(k d_{deflection})^2}{C_{piezo}}$$

The maximum energy generated by the piezo 142 is its charge distributed only onto its internal capacitor $$E_{max} = \frac{1}{2} \frac{(k d_{deflection})^2}{C_{piezo}}$$

Since $E_{cMax}$ is 25% of $E_{max}$, the energy capture circuit is 25% efficient producing a captured voltage of $$v_{cMax} = \frac{Q_{piezo}}{2 C_{piezo}}$$
$$= \frac{k d_{deflection}}{2 C_{piezo}}$$

The power generated by this device is given by $$P_c = f_{tireRotation} E_{cMax}$$
$$= \frac{1}{2} \frac{(k d_{deflection})^2}{C_{piezo}} f_{tireRotation} \propto f_{tireRotation}$$

and is proportional to the tire rotation rate.

If the piezo circuitry has significant source resistance (e.g. the rectifier 52), the energy captured on the capacitor is reduced but, using the same logic as for the magnet-coil generator, an optimal capture capacitor can be calculated. If in FIG. 15 the normally large piezo internal resistance 172 $R_{piezo}$ is ignored, and the rectifier 52 replaced by a source resistance $R_{source}$ representing all resistance from the piezo 142 to the capture capacitor 58, the coupled differential equations representing $v_{piezo}$ and $v_c$, are $$\dot{v}_{piezo}(t) = \frac{v_c - v_{piezo}}{R_{source} C_{piezo}}$$

$$\dot{v}_c(t) = \frac{v_{piezo} - v_c}{R_{source} C}$$

having initial conditions $$v_{piezo}(0) = \frac{Q_{piezo}}{C_{piezo}}$$

$$v_c(0) = 0$$

Figure 30:
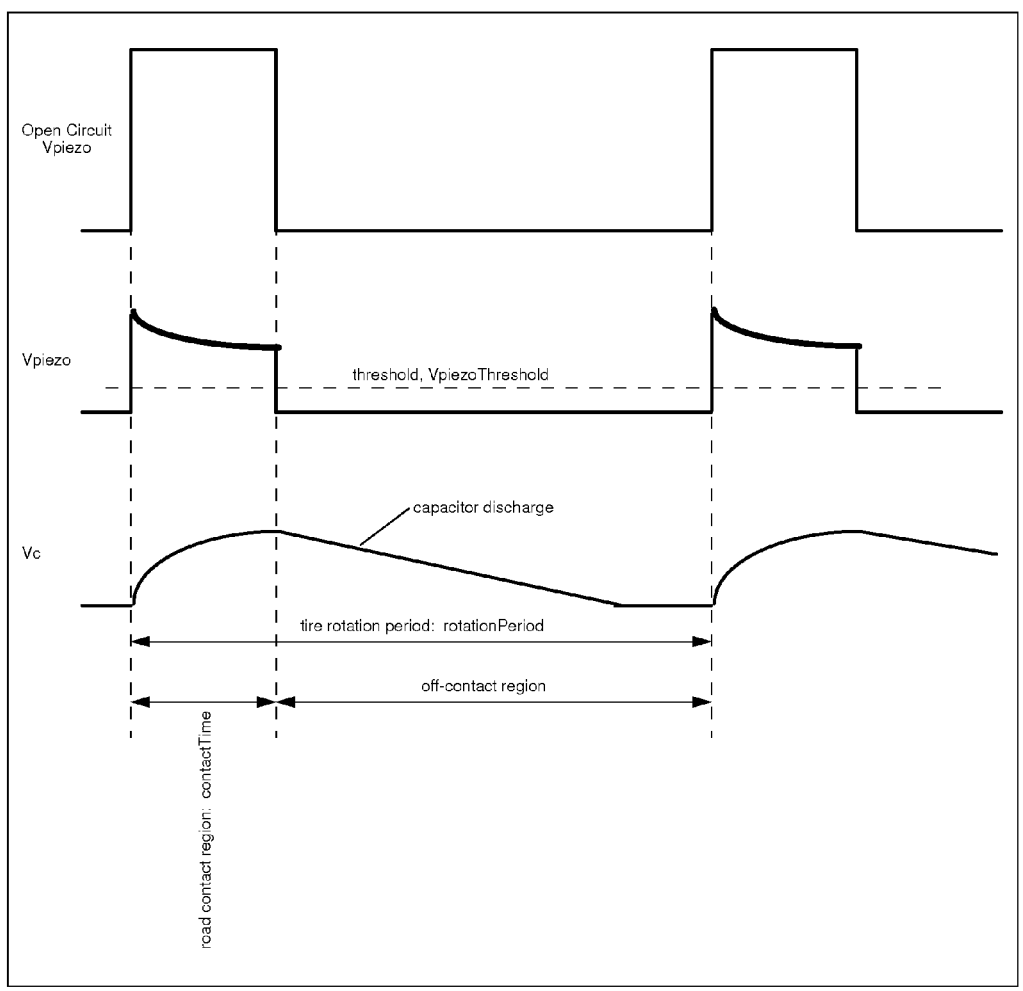
FIG. 30 is a graphical plot of the piezo-electric generator circuit voltages vs. time: the open circuit unloaded piezo voltage $v_{piezo}$, the actual piezo voltage with loading by the capture capacitor, and the $v_c$ the capture capacitor voltage after peak capture of the actual $v_{piezo}$ and during discharge; also shown is the relationship of the signals to the off-and on-road contact status of the tire as well as a threshold setting used to measure the $v_{piezo}$ pulse widths and periodicity.

Applying elementary calculus, these coupled equations are solved as $$v_{piezo}(t) = \frac{Q_{piezo}}{C_{piezo} + C} \left( 1 + \frac{C}{C_{piezo}} e^{-\frac{C_{piezo} + C}{R_{source} C_{piezo} C} t} \right)$$

$$v_c(t) = \frac{Q_{piezo}}{C_{piezo} + C} \left( 1 - e^{-\frac{C_{piezo} + C}{R_{source} C_{piezo} C} t} \right)$$

as illustrated in FIG. 30.

The $v_c(t)$ function has its maximum at the time when the piezo ceases to generate charge, the time when the generator leaves the contact region, and this results in a pulse width T equal to the road contact time. With this pulse width, the energy captured on the capacitor is:

$$E_{cMax} = \frac{C}{2} \left( \frac{Q_{piezo}}{C_{piezo} + C} \right)^2 \left( 1 - e^{-\frac{C_{piezo} + C}{R_{source} C_{piezo} C} T} \right)^2$$

and the optimal value of C is that which forces the derivative of $E_{cMax}$ with respect to C to equal zero and is given by $$\frac{C_{piezo} - C_{optimal}}{2(C_{piezo} + C_{optimal})} + \left[\frac{C_{optimal} - C_{piezo}}{2(C_{piezo} + C_{optimal})} + \frac{C_{piezo} + C_{optimal}}{C_{piezo}C_{optimal}^2}\left(\frac{T}{R_{source}}\right)^2\right]$$

$$e^{-\frac{C_{piezo}+C}{C_{piezo}C}\left(\frac{T}{R_{source}}\right)} = 0$$

Although this transcendental equation cannot be explicitly solved, it can be satisfied using a Newton-Raphson or other algorithm, as in the case of the magnet-coil analysis. The result is an optimal capture capacitor value dependent on the ratio of the measured pulse width T to the known source resistance $R_{source}$, and the known internal piezo capacitance $C_{piezo}$. This equation can be solved within an adaptive energy capture circuit 70 or pre-solved for various pulse widths with results stored in a table for use by the adaptive energy capture circuit 70.

The energy capture circuit 70 for this piezo device is much like that of FIG. 7 except the coil 32 is replaced by the piezo 142 and the temperature sensor 72 may not be needed unless the temperature is known to affect $C_{piezo}$ or $R_{source}$ and the optimal solution must take these changes into account. Further, the polarity of the $v_{pulse}$ signal to the adaptive controller 86 is inverted.

Alternately, the same dither logic described for the magnet-coil generator can be used to optimize the capture capacitor using an adaptive energy capture circuit 70 much like that of FIG. 8 except the coil 32 is replaced by the piezo 142 an the polarity of the $v_{pulse}$ signal to the adaptive controller 87 is inverted.

Either the horizontal or radial piezo generator can be coupled to only one inner wall as illustrated in FIG. 4, where the generator is generally indicated by the numeral 28.

Comparing the Magnet-Coil and Piezo-Electric Generators

Both generators described are relatively simple with a single moving part (the coil vs. the leaf spring). Given a fixed deflection displacement, the magnet-coil generator with optimal capacitor is 60% efficient and will generate increasing energy per tire rotation as the vehicle speeds up; the piezo generator is at best 25% efficient and will generate the same energy per rotation. Consequently, the magnet-coil generator will generate power that increases with the square of the speed while the piezo will generate power that increases linearly with the speed.

The magnetic pulse duration is the transition times from off-to-on contact while the piezo charge is available throughout the on-contact region.

Mounting a Generator onto the Inner Tread Surface

Figure 16:
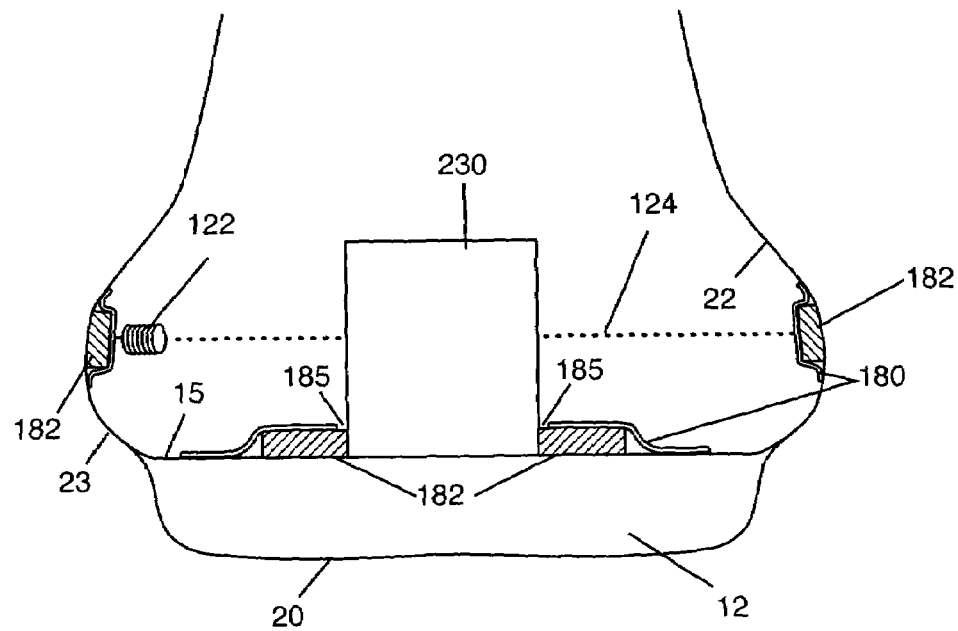
FIG. 16 is a side cutaway view of mounting a sidewall deflection generator in a tire using a modified tire patch having an aperture through which the generator projects and also showing the oversized substrate or base plate which the patch captures.

The inner wall deflection generator 230 is mounted onto the inner tread surface 15 using a substrate or base plate 182 and a modified tire patch 180. The tire patch 180 is modifed by adding an opening through which the generator 230 protrudes with the aim of capturing the substrate or base plate 182, built onto the base of the generator and larger than the opening, between the patch 180 and the tread inner surface 15 as illustrated in FIG. 16. Patches are also useful to mount the linkage to inner walls 22 at shoulder 23.

Figure 17:
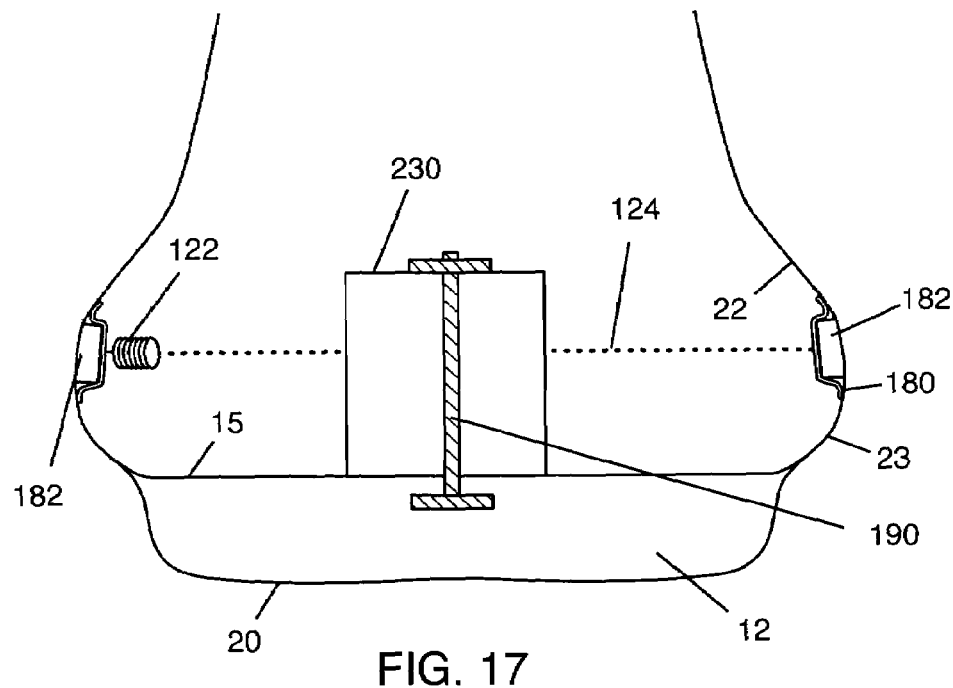
FIG. 17 is a side cutaway view of mounting an inner wall deflection generator in a tire using a flexible stud embedded in the tread with the stud holding the main generator housing against the inner tread surface.

Alternatively, mounting using a flexible stud 190 embedded in the tire 10 is illustrated in FIG. 17. Studs may also be used to mount the linkage to the inner walls 22.

Figure 19:
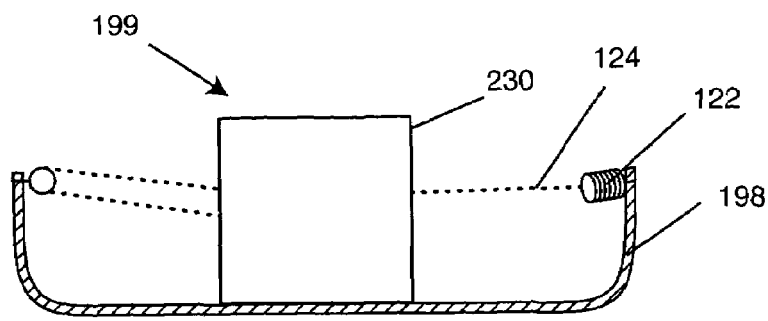
FIG. 19 is a side cutaway view of a standalone inner wall deflection generator insert.
Figure 19A:
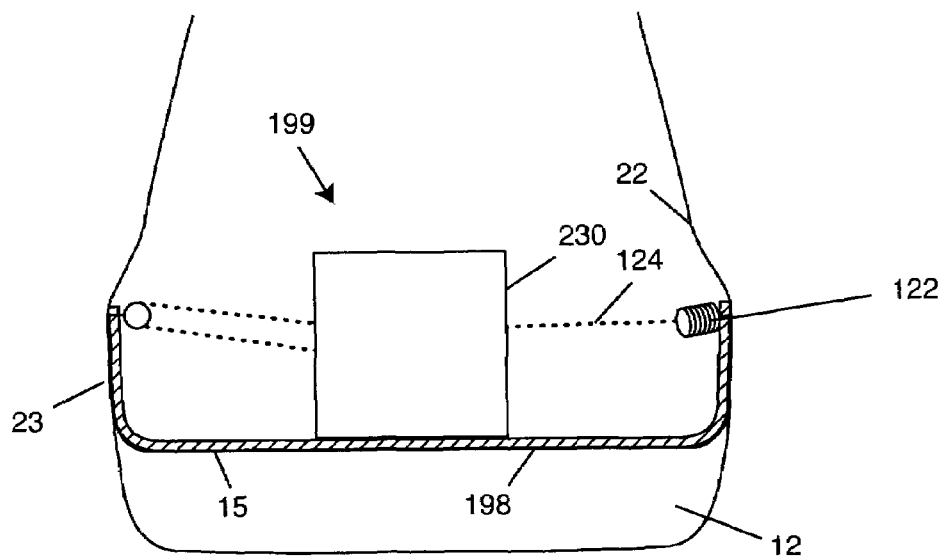
FIG. 19A is a side cutaway view of a standalone inner wall deflection generator insert and how it fits within the tire.
Figure 19B:
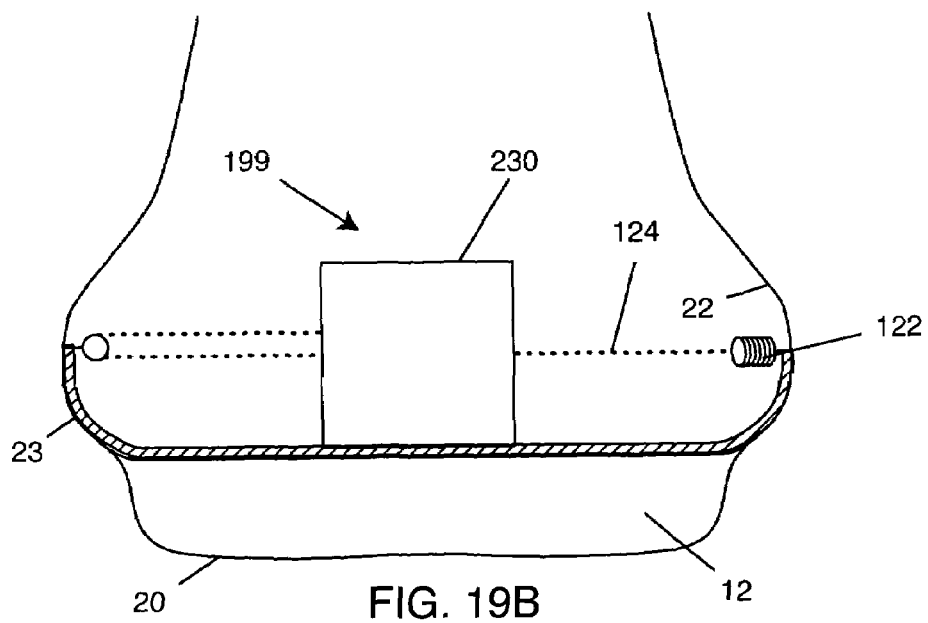
FIG. 19B is a side cutaway view of a standalone inner wall deflection generator insert and how it moves with the inner wall deflection motion when mounted in the tire.

Another mounting method is to build the generator as a unit 199 within a flexible insert 198 that is then positioned within the tire and adhered to the inner surfaces, as illustrated in FIG. 19. All linkage and generator mountings are made to the insert 198.

In conventional tires when running flat, the inner wall deflection generator is protected by the extended walls of the rim within which the tire fits and is held. This provides a metal well within which the generator is protected when on the road contact region.

Run Flat Tires

Figure 20:
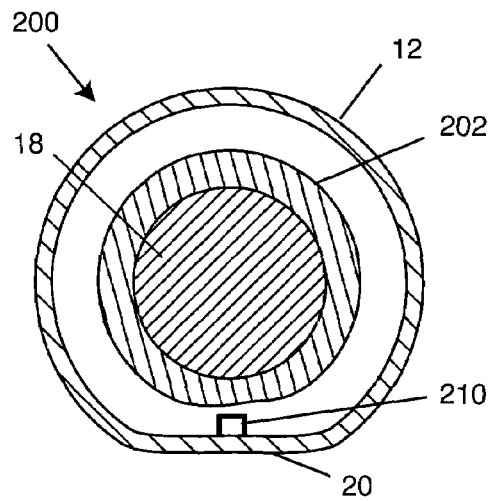
FIG. 20 is a front cutaway view of a conventional run flat tire shown when inflated and having a device mounted on its inner tread surface.
Figure 20A:
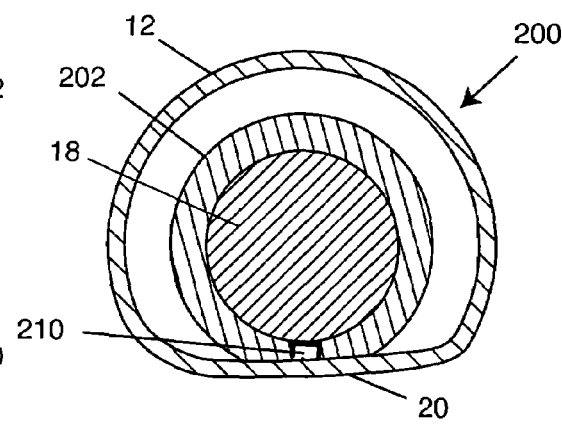
FIG. 20A is a front cutaway view of a conventional run flat tire shown when running flat and having a device mounted on its inner tread surface.
Figure 20B:
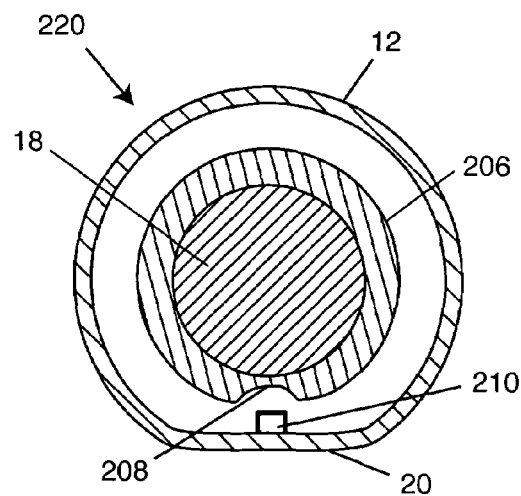
FIG. 20B is a front cutaway view of an altered run flat tire shown when inflated and modified with an inner core cutout to accommodate and protect an electronic device mounted its inner tread surface.
Figure 20C:
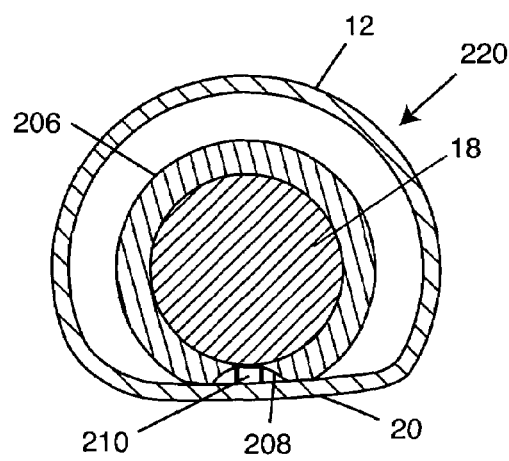
FIG. 20C is a front cutaway view of an altered run flat tire, shown when running flat, modified with an inner core cutout to accommodate and protect a device mounted its inner tread surface.

Run flat tires have an inner tire structure consisting, as illustrated in FIG. 20, of a somewhat flexible core 202 around rim 18. Should the tire go flat and its air pressure lost, the vehicle rides on core 202. A conventional run flat tire 200 when running flat, as shown in FIG. 20A, will place the vehicle load onto any device 210, be it a monitor or power generator, that is mounted onto its inner tread surface 15 and possibly damage it. As shown in FIGS. 20B and 20C, a run flat tire 220 with an inner core 206 having a cutout 208 to accommodate the device 210 affords protection by placing less load on the device 210. The dimensions of the cutout 208 should be larger than the device 210 to allow for core compression by the load, and for the angular motion of the device 210 relative to the cutout 208 as the device moves through the road contact region on the un-inflated tread. The cutout region can be filled with a material with greater flexibility than the main core itself.

Incorporating the Generator with Other Electronics

Figure 18:
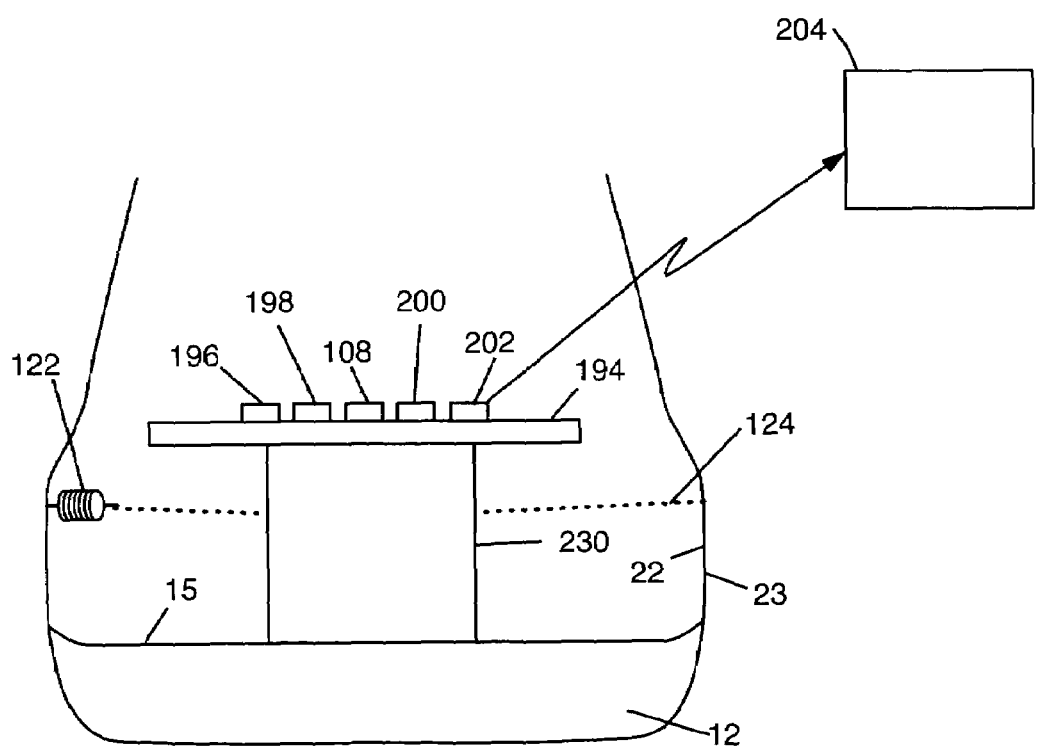
FIG. 18 is a side cutaway view illustrating the use of an inner wall deflection generator integral with the electronics it is to power.

The inner wall deflection generator 230 is constructed together with the electronics 194 it is to power by forming the electronics around it and using the generator 230 as a mounting platform. This is illustrated in FIG. 18. The electronics 194 includes at least one sensor 196 to monitor at least one tire parameter (pressure, temperature, acceleration, stress, etc.), a microcomputer 198 to process the sensor data, a vehicle radio transmitter 200 and antenna 202 to report the processed sensor information to a vehicle radio receiver 204 mounted on the vehicle, and an adaptive energy capture circuit 108 to maximize the energy developed by the generator 230.

Using the Generator Signals to Measure the Contact Length and Tire and Vehicle Status As illustrated in FIG. 27 and FIG. 30, the time duration of the contact length (contactTime) is measured by timing the magnet-coil generator $v_{coil}$ pulses or the duration of the piezo-electric generator $v_{piezo}$ pulse. The same signals are used to measure the rotation period of the tire (rotationPeriod). The length of the contact region 20 is given by $$contactLength = 2tireRadius \times \sin\left(\frac{\pi}{rotationPeriod}\left(contactTime + \frac{contactBias \times rotationPeriod}{2\pi \times tireRadius}\right)\right)$$

$$= 2tireRadius \times \sin\left(\frac{\pi \times contactTime}{rotationPeriod} + \frac{contactBias}{2tireRadius}\right)$$

$$\approx 2\pi \times tireRadius\left(\frac{contactTime}{rotationPeriod}\right) + contactBias$$

where contactBias is the effective footprint of the sensor along the circumference of the tire. Contact length is used to determine the tire rolling radius, volume, deflation, deflection angle, and (with tire pressure) the load on the tire, and (with tire temperature) the molar gas content in the tire, and other tire parameters. The loads on the tires are used to determine the mass of the vehicle, the distribution of mass, the location of the center-of-mass, and other vehicle parameters.

Determining contactTime and rotationPeriod: These values are measured from the $v_{coil}$ and $v_{piezo}$ signals. For the magnet-coil generator, compare the positive pulse to a positive threshold, $v_{magThreshold+}$, and note the time, startContactTime, the signal rises through the threshold, and compare the negative pulse to a negative threshold, $v_{magThreshold-}$, and note when the time, endContactTime, when the signal rises through the threshold. The difference between these times is the contactTime, and the difference between the current startContactTime (or endContactTime) and the previous one is the rotationperiod.

For the piezo-electric generator, compare the positive pulse to a threshold, $v_{piezoThreshold}$, and noting the time, startContactTime, the signal rises through the threshold, and noting when the time, endContactTime, when the signal falls through the threshold. The difference between these times is the contactTime, and the difference between the current startContactTime (or endContactTime) and the previous one is the rotationPeriod.

contactTime=endContactTime−startContactTime rotationPeriod=endContactTime−previous endContactTime Other Embodiments While several illustrative embodiments of the invention have been shown and described, numerous variations and alternate embodiments will occur to those skilled in the art. For example, the linkage between the tire surfaces and the generator is a pneumatic link where the inner wall motions drive a bellows or piston that pump a compressible or incompressible fluid; the generator is any type that converts the linkage action into electricity or any other form of energy; the linkage can be any type that conducts the inner wall motion to the generator; the energy so generated can be used directly with or without pulse capture; the optimal pulse energy capture method, due to the well-known equivalence between electrical and mechanical devices, is not limited to electrical energy and may be based on different principals than suggested herein; the active portion of the tire can be anywhere along the inner wall surface from the tread to the rim; the run flat tire cutout can be generalized to any method that keeps the vehicle weight away from the protected device. Such variations and alternate embodiments, as well as others, are contemplated and can be made without departing from the spirit and scope of the invention as defined in the appended claims.

What is claimed is:

1. A device, adapted to be mounted on a vehicle tire, for obtaining energy from the load-induced tire deflections of at least one tire inner wall while rotating upon a load-bearing surface, the device comprising:

a substrate;

an energy converter, mounted on the substrate, coupled to said deflections and converting said deflections into pulsed electrical output energy;

capture electronics for capturing said pulsed electrical output energy, wherein said capture electronics maximizes the captured energy by adaptation to at least one characteristic of the pulsed electrical energy:

at least one capacitor where the said at least one characteristic is the pulse width of the pulsed electrical energy; and the adaptation is to select the value of the at least one capacitor based on the pulse width of the pulsed electrical energy.

2. A device, adapted to be mounted on a vehicle tire, for obtaining energy from the load-induced tire deflections of at least one tire inner wall while rotating upon a load-bearing surface, the device comprising:

a substrate;

an energy converter, mounted on the substrate, coupled to said deflections and converting said deflections into pulsed electrical output energy;

capture electronics for capturing said pulsed electrical output energy, wherein said capture electronics maximizes the captured energy by adaptation to at least one characteristic of the pulsed electrical energy;

at least one capacitor where the said at least one characteristic is the voltage captured on the at least one capacitor from the pulsed electrical energy; and the adaptation is to select the at least one capacitor value based on said voltage.

3. In a tire adapted to be mounted on a vehicle wheel, a device for obtaining energy from the tire while said tire is rotating upon a load-bearing surface, the device comprising:

a substrate attached to the tire at a selected radial and circumferential location;

an energy converter mounted on the substrate, the converter being disposed to respond to the load induced deflections of at least one tire inner wall to convert said deflections to pulsed electrical output energy;

capture electronics for capturing said pulsed electrical output energy, wherein said capture electronics further determines at least one feature of the pulsed electrical energy and adaptively changes its configuration so as to maximize the energy captured; and at least one capacitor for capturing the said pulsed electrical energy and wherein the said at least one feature is the electrical energy pulse width and said configuration is adapted by selecting the capacitor value based on said pulse width.

4. In a tire adapted to be mounted on a vehicle wheel, a device for obtaining energy from the tire while said tire is rotating upon a load-bearing surface, the device comprising:

a substrate attached to the tire at a selected radial and circumferential location;

an energy converter mounted on the substrate, the converter being disposed to respond to the load induced deflections of at least one tire inner wall to convert said deflections to pulsed electrical output energy;

capture electronics for capturing said pulsed electrical output energy, wherein said capture electronics further determines at least one feature of the pulsed electrical energy and adaptively changes its configuration so as to maximize the energy captured; and at least one capacitor for capturing the said pulsed electrical energy and wherein the said at least one feature is the voltage captured on the at least one capacitor from the pulsed electrical energy and said configuration is adapted by selecting the at least capacitor value based on said voltage.

5. A device, adapted to be mounted on a vehicle tire, for obtaining energy from the load-induced tire deflections of at least one tire inner wall while rotating upon a load-bearing surface, the device comprising:
an energy converter coupled to said deflections and converting said deflections into pulsed electrical energy, and
capture electronics for capturing said pulsed electrical energy, wherein said capture electronics maximizes the captured energy by adaptation to at least one characteristic of the pulsed electrical energy, and wherein said capture electronics comprises:
at least two capacitors where the said at least one characteristic is the pulse width of the pulsed electrical energy; and
the adaptation is to enable the combination of said at least two capacitors based on the pulse width.

6. A device, adapted to be mounted on a vehicle tire, for obtaining energy from the load-induced tire deflections of at least one tire inner wall while rotating upon a load-bearing surface, the device comprising:
an energy converter coupled to said deflections and converting said deflections into pulsed electrical energy, and
capture electronics for capturing said pulsed electrical energy, wherein said capture electronics maximizes the captured energy by adaptation to at least one characteristic of the pulsed electrical energy, and wherein said capture electronics comprises:
at least two capacitors where the said at least one characteristic is the voltage captured on the at least two capacitors from the pulsed electrical energy; and
the adaptation is to enable the combination of said at least two capacitors based on the voltage.

7. A method for obtaining electrical energy from a vehicle tire while said tire is rotating upon a load-bearing surface, the method comprising the steps of:
coupling an electrical energy converting device to the load-induced deflections of at least one tire inner wall, wherein the source resistance of the energy converting device is known;
determining at least one feature of the electrical energy pulses;
capturing the electrical energy pulses on a capturing mechanism;
adapting the capturing mechanism to maximize the electrical energy capture based on at least one feature of the pulses and said at least one feature comprises the ratio of the pulse width to the resistance; and
outputting the captured electrical energy;

8. A device, adapted to be mounted on a rotating vehicle tire while rotating upon a load-bearing surface, for maximizing the captured electrical pulsed energy generated generated by an energy source coupled to the load-induced tire deflections and generating at least one energy pulse per tire rotation, the device comprising:
capture electronics for capturing said pulsed electrical output energy, wherein said electronics monitors at least one characteristic of said at least one pulse per revolution and maximizes the captured energy by adaptation to said at least one characteristic, wherein said capture electronics comprises at least two energy storage capacitors and said adaptation comprises selecting the combination of said capacitors.

9. The device according to claim 8, wherein said at least one characteristic is the incoming pulse width of the generated pulsed energy.

10. The device according to claim 8, wherein said at least one characteristic is the ratio of the incoming pulse width of the pulsed energy to the source resistance of the energy source.

11. The device according to claim 8, wherein said at least one characteristic is the incoming voltage of the pulsed energy.

12. The device according to claim 8, wherein said at least one characteristic is the energy captured.

13. The device according to claim 8, wherein the energy source comprises a piezo-electric device.

14. The device according to claim 8, wherein the energy source comprises a magnet and coil combination.

15. The device according to claim 8, further comprising:
a substrate on which said electronics is mounted; and
a base plate securing said substrate to the tire.

16. The device according to claim 15, wherein said base plate further has opposed parallel inner and outer surfaces and a periphery, said outer surface engaging an inner surface of the tire, and said device further comprises:
a patch overlying the inner surface of said base plate, said base plate being sandwiched between said patch and said inner surface of the tire, said patch further having a portion extending beyond said periphery of the base plate, said portion of said patch being bonded to said inner surface of the tire, and wherein said patch includes an aperture through which the substrate projects and is flexibly held to the tire.

17. A method to maximize the captured electrical pulsed energy generated by an energy source coupled to the load-induced tire deflections, the method comprising the steps of:
causing the tire to rotate on a load-bearing surface such that the energy source generates at least one energy pulse per rotation;
capturing the incoming energy pulses on a mechanism;
monitoring at least one feature of the incoming energy pulses;
adapting the capturing mechanism to maximize the energy capture based on said at least one feature wherein the adaptation is to select a combination from at least two energy storage capacitors; and
outputting the captured electrical energy.

18. The method according to claim 17, wherein said at least one feature comprises the incoming pulse width.

19. The method according to claim 17, wherein the source resistance of the energy generating device is known and said at least one feature comprises the ratio of the incoming pulse width to the resistance.

20. The method according to claim 17, wherein said at least one feature comprises the incoming pulse voltage.

21. The method according to claim 17, wherein said at least one feature comprises the energy captured.

* * * * *